US011637962B2

(12) United States Patent
Martel et al.

(10) Patent No.: US 11,637,962 B2
(45) Date of Patent: *Apr. 25, 2023

(54) COMPUTER-VISION-BASED OBJECT TRACKING AND GUIDANCE MODULE

(71) Applicant: Position Imaging, Inc., Portsmouth, NH (US)

(72) Inventors: Brian Martel, Farmington, NH (US); YiFeng Xiong, Madbury, NH (US); Drew Anthony Schena, Portsmouth, NH (US); Narasimhachary Nallana Chakravarty, Rollinsford, NH (US); Rafal Piotrowski, Portsmouth, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,479

(22) Filed: Jul. 9, 2021

(65) Prior Publication Data

US 2021/0337103 A1 Oct. 28, 2021

Related U.S. Application Data

(63) Continuation of application No. 16/740,679, filed on Jan. 13, 2020, now Pat. No. 11,089,232.
(Continued)

(51) Int. Cl.
*G06Q 10/08* (2012.01)
*H04N 5/235* (2006.01)
(Continued)

(52) U.S. Cl.
CPC ....... *H04N 5/2354* (2013.01); *G06Q 10/0833* (2013.01); *G06Q 10/0836* (2013.01);
(Continued)

(58) Field of Classification Search
CPC ............... G06K 7/1413; G06K 7/1417; G06K 19/06037; G06K 7/10722;
(Continued)

(56) References Cited

U.S. PATENT DOCUMENTS 2,408,122 A 9/1946 Wirkler
3,824,596 A 7/1974 Guion et al.
(Continued)

FOREIGN PATENT DOCUMENTS

DE 102017205958 A1 10/2018
WO 2001006401 A1 1/2001
(Continued)

OTHER PUBLICATIONS

Final Office Action in U.S. Appl. No. 15/091,180 dated May 12, 2022.
(Continued)

*Primary Examiner* — Daniel Chang
(74) *Attorney, Agent, or Firm* — Schmeiser, Olsen & Watts LLP

(57) ABSTRACT

An apparatus comprises a mount body by which the apparatus is secured to a structure. A camera assembly includes an image sensor adapted to capture images within its field of view. A lighting assembly houses one or more light sources including a directional light source. A control-board assembly, fixed to the mount body, houses control boards including one or more processors configured to acquire information about an object, to associate a location within the field of view of the image sensor with the object, to point light emitted by the directional light source at the location associated with the object by rotating the lighting assembly and turning the laser assembly, and, based on an image acquired
(Continued)

from the camera assembly, to detect change within the field of view of the image sensor corresponding to placement or removal of the object.

20 Claims, 26 Drawing Sheets

Related U.S. Application Data

(60) Provisional application No. 62/791,413, filed on Jan. 11, 2019.

(51) Int. Cl.
  *G06T 7/521* (2017.01)
  *H04N 9/097* (2006.01)
  *G06Q 10/0833* (2023.01)
  *H04N 7/18* (2006.01)
  *G06Q 10/0836* (2023.01)
  *H04N 5/225* (2006.01)

(52) U.S. Cl.
  CPC ............ *G06T 7/521* (2017.01); *H04N 5/2253* (2013.01); *H04N 7/181* (2013.01); *H04N 9/097* (2013.01)

(58) Field of Classification Search
  CPC ......... G06K 19/06028; G06K 19/0614; G06K 7/1447; G06K 7/1465; G06K 9/00288; G06K 9/00624; G06Q 10/087; G06Q 10/06312; G06Q 10/08; G06Q 30/0185; G06Q 50/28; G06Q 10/0833; G06Q 20/3276; H04N 5/2253; H04N 5/23238; H04N 5/2256; H04N 5/2258; H04N 1/00045; H04N 1/00334; H04N 5/247; H04N 1/00363
  See application file for complete search history.

(56) References Cited

U.S. PATENT DOCUMENTS

| | | |
|---|---|---|
| 3,940,700 A | 2/1976 | Fischer |
| 4,018,029 A | 4/1977 | Safranski et al. |
| 4,328,499 A | 5/1982 | Anderson et al. |
| 4,570,416 A | 2/1986 | Shoenfeld |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,545,880 A | 8/1996 | Bu et al. |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,671,362 A | 9/1997 | Cowe et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,285,916 B1 | 9/2001 | Kadaba et al. |
| 6,292,750 B1 | 9/2001 | Lin |
| 6,409,687 B1 | 6/2002 | Foxlin |
| 6,417,802 B1 | 7/2002 | Diesel |
| 6,492,905 B2 | 12/2002 | Mathias et al. |
| 6,496,778 B1 | 12/2002 | Lin |
| 6,512,748 B1 | 1/2003 | Mizuki et al. |
| 6,593,885 B2 | 7/2003 | Wisherd et al. |
| 6,619,550 B1 | 9/2003 | Good et al. |
| 6,630,904 B2 | 10/2003 | Gustafson et al. |
| 6,634,804 B1 | 10/2003 | Foste et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,988,079 B1 | 1/2006 | Or-Bach et al. |
| 6,989,789 B2 | 1/2006 | Ferreol et al. |
| 7,009,561 B2 | 3/2006 | Menache et al. |
| 7,104,453 B1 | 9/2006 | Zhu et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,353,994 B2 | 4/2008 | Farrall et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,689,465 B1 | 3/2010 | Shakes et al. |
| 7,844,507 B2 | 11/2010 | Levy |
| 7,868,760 B2 | 1/2011 | Smith et al. |
| 7,876,268 B2 | 1/2011 | Jacobs |
| 7,933,730 B2 | 4/2011 | Li et al. |
| 7,995,109 B2 | 8/2011 | Kamada et al. |
| 8,009,918 B2 | 8/2011 | Van Droogenbroeck et al. |
| 8,189,855 B2 | 5/2012 | Opalach et al. |
| 8,201,737 B1 | 6/2012 | Palacios Durazo et al. |
| 8,219,438 B1 | 7/2012 | Moon et al. |
| 8,269,624 B2 | 9/2012 | Chen et al. |
| 8,295,542 B2 | 10/2012 | Albertson et al. |
| 8,406,470 B2 | 3/2013 | Jones et al. |
| 8,457,655 B2 | 6/2013 | Zhang et al. |
| 8,619,144 B1 | 12/2013 | Chang et al. |
| 8,749,433 B2 | 6/2014 | Hill |
| 8,843,231 B2 | 9/2014 | Ragusa et al. |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,171,278 B1 | 10/2015 | Kong et al. |
| 9,174,746 B1 | 11/2015 | Bell et al. |
| 9,269,022 B2 | 2/2016 | Rhoads et al. |
| 9,349,076 B1 | 5/2016 | Liu et al. |
| 9,424,493 B2 | 8/2016 | He et al. |
| 9,482,741 B1 | 11/2016 | Min et al. |
| 9,497,728 B2 | 11/2016 | Hill |
| 9,500,396 B2 | 11/2016 | Yoon et al. |
| 9,514,389 B1 | 12/2016 | Erhan et al. |
| 9,519,344 B1 | 12/2016 | Hill |
| 9,544,552 B2 | 1/2017 | Takahashi |
| 9,594,983 B2 | 3/2017 | Alattar et al. |
| 9,656,749 B1 | 5/2017 | Hanlon |
| 9,740,937 B2 | 8/2017 | Zhang et al. |
| 9,782,669 B1 | 10/2017 | Hill |
| 9,872,151 B1 | 1/2018 | Puzanov et al. |
| 9,904,867 B2 | 2/2018 | Fathi et al. |
| 9,933,509 B2 | 4/2018 | Hill et al. |
| 9,961,503 B2 | 5/2018 | Hill |
| 9,996,818 B1 | 6/2018 | Ren et al. |
| 10,001,833 B2 | 6/2018 | Hill |
| 10,148,918 B1 | 12/2018 | Seiger et al. |
| 10,163,149 B1 | 12/2018 | Famularo et al. |
| 10,180,490 B1 | 1/2019 | Schneider et al. |
| 10,257,654 B2 | 4/2019 | Hill |
| 10,324,474 B2 | 6/2019 | Hill et al. |
| 10,332,066 B1 | 6/2019 | Palaniappan et al. |
| 10,373,322 B1 | 8/2019 | Buibas et al. |
| 10,399,778 B1 | 9/2019 | Shekhawat et al. |

(56) References Cited

U.S. PATENT DOCUMENTS

| | | |
|---|---|---|
| 10,416,276 B2 | 9/2019 | Hill et al. |
| 10,444,323 B2 | 10/2019 | Min et al. |
| 10,455,364 B2 | 10/2019 | Hill |
| 10,605,904 B2 | 3/2020 | Min et al. |
| 10,853,757 B1 | 12/2020 | Hill et al. |
| 2001/0027995 A1 | 10/2001 | Patel et al. |
| 2002/0021277 A1 | 2/2002 | Kramer et al. |
| 2002/0095353 A1 | 7/2002 | Razumov |
| 2002/0140745 A1 | 10/2002 | Ellenby et al. |
| 2002/0177476 A1 | 11/2002 | Chou |
| 2003/0024987 A1 | 2/2003 | Zhu |
| 2003/0053492 A1 | 3/2003 | Matsunaga |
| 2003/0110152 A1 | 6/2003 | Hara |
| 2003/0115162 A1 | 6/2003 | Konick |
| 2003/0120425 A1 | 6/2003 | Stanley et al. |
| 2003/0176196 A1 | 9/2003 | Hall et al. |
| 2003/0184649 A1 | 10/2003 | Mann |
| 2003/0195017 A1 | 10/2003 | Chen et al. |
| 2004/0002642 A1 | 1/2004 | Dekel et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2004/0267640 A1 | 12/2004 | Bong et al. |
| 2005/0001712 A1 | 1/2005 | Yarbrough |
| 2005/0057647 A1 | 3/2005 | Nowak |
| 2005/0062849 A1 | 3/2005 | Foth et al. |
| 2005/0074162 A1 | 4/2005 | Tu et al. |
| 2005/0143916 A1 | 6/2005 | Kim et al. |
| 2005/0154685 A1 | 7/2005 | Mundy et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0073552 A1 | 3/2007 | Hileman |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2007/0237356 A1 | 10/2007 | Dwinell et al. |
| 2008/0007398 A1 | 1/2008 | DeRose et al. |
| 2008/0035390 A1 | 2/2008 | Wurz |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0156619 A1 | 7/2008 | Patel et al. |
| 2008/0174485 A1 | 7/2008 | Carani et al. |
| 2008/0183328 A1 | 7/2008 | Danelski |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0073428 A1 | 3/2009 | Magnus et al. |
| 2009/0114575 A1 | 5/2009 | Carpenter et al. |
| 2009/0121017 A1 | 5/2009 | Cato et al. |
| 2009/0149202 A1 | 6/2009 | Hill et al. |
| 2009/0224040 A1 | 9/2009 | Kushida et al. |
| 2009/0243932 A1 | 10/2009 | Moslifeghi |
| 2009/0245573 A1 | 10/2009 | Saptharishi et al. |
| 2009/0323586 A1 | 12/2009 | Hohl et al. |
| 2010/0019905 A1 | 1/2010 | Boddie et al. |
| 2010/0076594 A1 | 3/2010 | Salour et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0002509 A1 | 1/2011 | Nobori et al. |
| 2011/0006774 A1 | 1/2011 | Baiden |
| 2011/0037573 A1 | 2/2011 | Choi |
| 2011/0066086 A1 | 3/2011 | Aarestad et al. |
| 2011/0166694 A1 | 7/2011 | Griffits et al. |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2011/0286633 A1 | 11/2011 | Wang et al. |
| 2011/0313893 A1 | 12/2011 | Weik, III |
| 2011/0315770 A1 | 12/2011 | Patel et al. |
| 2012/0013509 A1 | 1/2012 | Wisherd et al. |
| 2012/0020518 A1 | 1/2012 | Taguchi |
| 2012/0081544 A1 | 4/2012 | Wee |
| 2012/0087572 A1 | 4/2012 | Dedeoglu et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0257061 A1 | 10/2012 | Edwards et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moslifeghi |
| 2013/0036043 A1 | 2/2013 | Faith |
| 2013/0051624 A1 | 2/2013 | Iwasaki et al. |
| 2013/0063567 A1 | 3/2013 | Burns et al. |
| 2013/0073093 A1 | 3/2013 | Songkakul |
| 2013/0113993 A1 | 5/2013 | Dagit, III |
| 2013/0182114 A1 | 7/2013 | Zhang et al. |
| 2013/0191193 A1 | 7/2013 | Calman et al. |
| 2013/0226655 A1 | 8/2013 | Shaw |
| 2013/0281084 A1 | 10/2013 | Batada et al. |
| 2013/0293684 A1 | 11/2013 | Becker et al. |
| 2013/0293722 A1 | 11/2013 | Chen |
| 2013/0314210 A1 | 11/2013 | Schoner et al. |
| 2013/0335318 A1 | 12/2013 | Nagel et al. |
| 2013/0335415 A1 | 12/2013 | Chang |
| 2014/0022058 A1 | 1/2014 | Striemer et al. |
| 2014/0108136 A1 | 4/2014 | Zhao et al. |
| 2014/0139426 A1 | 5/2014 | Kryze et al. |
| 2014/0253368 A1 | 9/2014 | Holder |
| 2014/0270356 A1 | 9/2014 | Dearing et al. |
| 2014/0300516 A1 | 10/2014 | Min et al. |
| 2014/0317005 A1 | 10/2014 | Balwani |
| 2014/0330603 A1 | 11/2014 | Corder et al. |
| 2014/0357295 A1 | 12/2014 | Skomra et al. |
| 2014/0361078 A1 | 12/2014 | Davidson |
| 2015/0009949 A1 | 1/2015 | Khoryaev et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0055821 A1 | 2/2015 | Fotland |
| 2015/0059374 A1 | 3/2015 | Hebel |
| 2015/0085096 A1 | 3/2015 | Smits |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0170002 A1 | 6/2015 | Szegedy et al. |
| 2015/0202770 A1 | 7/2015 | Patron et al. |
| 2015/0210199 A1 | 7/2015 | Payne |
| 2015/0221135 A1 | 8/2015 | Hill et al. |
| 2015/0227890 A1 | 8/2015 | Bednarek et al. |
| 2015/0248765 A1 | 9/2015 | Criminisi et al. |
| 2015/0254906 A1 | 9/2015 | Berger et al. |
| 2015/0278759 A1 | 10/2015 | Harris et al. |
| 2015/0310539 A1 | 10/2015 | McCoy et al. |
| 2015/0323643 A1 | 11/2015 | Hill et al. |
| 2015/0341551 A1 | 11/2015 | Perrin et al. |
| 2015/0362581 A1 | 12/2015 | Friedman et al. |
| 2015/0371178 A1 | 12/2015 | Abhyanker et al. |

(56) References Cited

U.S. PATENT DOCUMENTS

| | | |
|---|---|---|
| 2015/0371319 A1 | 12/2015 | Argue et al. |
| 2015/0379366 A1 | 12/2015 | Nomura et al. |
| 2016/0035078 A1 | 2/2016 | Lin et al. |
| 2016/0063610 A1 | 3/2016 | Argue et al. |
| 2016/0093184 A1 | 3/2016 | Locke et al. |
| 2016/0098679 A1 | 4/2016 | Levy |
| 2016/0140436 A1 | 5/2016 | Yin et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0195602 A1 | 7/2016 | Meadow |
| 2016/0232857 A1 | 8/2016 | Tamaru |
| 2016/0238692 A1 | 8/2016 | Hill et al. |
| 2016/0248969 A1 | 8/2016 | Hurd |
| 2016/0256100 A1 | 9/2016 | Jacofsky et al. |
| 2016/0286508 A1 | 9/2016 | Khoryaev et al. |
| 2016/0300187 A1 | 10/2016 | Kashi et al. |
| 2016/0335593 A1 | 11/2016 | Clarke et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0066597 A1 | 3/2017 | Hiroi |
| 2017/0117233 A1 | 4/2017 | Anayama et al. |
| 2017/0123426 A1 | 5/2017 | Hill et al. |
| 2017/0140329 A1 | 5/2017 | Bernhardt et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0293885 A1 | 10/2017 | Grady et al. |
| 2017/0313514 A1 | 11/2017 | Lert, Jr. et al. |
| 2017/0323174 A1 | 11/2017 | Joshi et al. |
| 2017/0323376 A1 | 11/2017 | Glaser et al. |
| 2017/0350961 A1 | 12/2017 | Hill et al. |
| 2017/0351255 A1 | 12/2017 | Anderson et al. |
| 2017/0359573 A1 | 12/2017 | Kim et al. |
| 2017/0372524 A1 | 12/2017 | Hill |
| 2017/0374261 A1 | 12/2017 | Teich et al. |
| 2018/0003962 A1 | 1/2018 | Urey et al. |
| 2018/0033151 A1 | 2/2018 | Matsumoto et al. |
| 2018/0068100 A1 | 3/2018 | Seo |
| 2018/0068266 A1 | 3/2018 | Kirmani et al. |
| 2018/0094936 A1 | 4/2018 | Jones et al. |
| 2018/0108134 A1 | 4/2018 | Venable et al. |
| 2018/0139431 A1 | 5/2018 | Simek et al. |
| 2018/0164103 A1 | 6/2018 | Hill |
| 2018/0197139 A1 | 7/2018 | Hill |
| 2018/0197218 A1 | 7/2018 | Mallesan et al. |
| 2018/0231649 A1 | 8/2018 | Min et al. |
| 2018/0242111 A1 | 8/2018 | Hill |
| 2018/0339720 A1 | 11/2018 | Singh |
| 2019/0029277 A1 | 1/2019 | Skrædderdal et al. |
| 2019/0053012 A1 | 2/2019 | Hill |
| 2019/0073785 A1 | 3/2019 | Hafner et al. |
| 2019/0090744 A1 | 3/2019 | Mahfouz |
| 2019/0098263 A1 | 3/2019 | Seiger et al. |
| 2019/0138849 A1 | 5/2019 | Zhang |
| 2019/0295290 A1 | 9/2019 | Schena et al. |
| 2019/0394448 A1 | 12/2019 | Ziegler et al. |
| 2020/0005116 A1 | 1/2020 | Kuo |
| 2020/0011961 A1 | 1/2020 | Hill et al. |
| 2020/0012894 A1 | 1/2020 | Lee |
| 2020/0097724 A1 | 3/2020 | Chakravarty et al. |
| 2022/0405704 A1 | 12/2022 | Kirmani |

FOREIGN PATENT DOCUMENTS

| | | | |
|---|---|---|---|
| WO | 2005010550 A1 | 2/2005 | |
| WO | 2009007198 A1 | 1/2009 | |
| WO | WO-2018067127 A1 * | 4/2018 | ............... B62B 1/12 |
| WO | 2020061276 A1 | 3/2020 | |

OTHER PUBLICATIONS

Notice of Allowance in U.S. Appl. No. 15/259,474 dated Jul. 11, 2022.

Shakeri, Moein and Hong Zhang, "Cooperative Targeting: Detection and Tracking of Small Objects with a Dual Camera System" Field and Service Robotics, Springer, Cham, 2015.

International Preliminary Report on Patentability in PCT/US2020/013280 dated Jul. 22, 2021.

Non-Final Office Action in U.S. Appl. No. 16/740,679, dated Jan. 6, 2021; 15 pages.

Notice of Allowance and Fees Due in U.S. Appl. No. 16/740,679, dated Apr. 20, 2021; 15 pages.

International Search Report and Written Opinion in PCT/US2020/013280 dated Mar. 10, 2020; 9 pages.

Szeliski, Richard "Image Alignment and Stitching: A Tutorial,:" Technical Report, MST-TR-2004-92, Dec. 10, 2006.

Xu, Wei and Jane Mulligan "Performance Evaluation of Color Correction Approaches for Automatic Multi-view Image and Video Stitching," International Converence on Computer Vision and Pattern Recognition (CVPR10), San Francisco, CA, 2010.

International Preliminary Report on Patentability in PCT/US2019/051874, dated Apr. 1, 2021; 8 pages.

Wilde, Andreas, "Extended Tracking Range Delay-Locked Loop," Proceedings IEEE International Conference on Communications, Jun. 1995, pp. 1051-1054.

Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Schmidt & Phillips, "INS/GPS Integration Architectures", NATO RTO Lecture Seders, First Presented Oct. 20-21, 2003.

Yong Yang, "Tightly Coupled MEMS INS/GPS Integration with INS Aided Receiver Tracking Loops", Jun. 2008, UCGE Reports No. 20270.

Sun, et al., "Analysis of the Kalman Filter With Different INS Error Models for GPS/INS Ntegration in Aerial Remote Sensing Applications", Bejing, 2008, The International Archives of the Photogrammerty, Remote Sensing and Spatial Information Sciences vol. XXXVII, Part B5.

Vikas Numar N., "Integration of Inertial Navigation System and Global Positioning System Using Kalman Filtering", M.Tech Dissertation, Indian Institute of Technology, Bombay, Mumbai, Jul. 2004.

Santiago Alban, "Design and Performance of a Robust GPS/INS Attitude System for Automobile Applications", Dissertation, Stanford University, Jun. 2004.

Roakis, John G. and Masoud Salehi, "Communication Systems Engineering", Second Edition, Prentice-Hall, Inc., Upper Saddle River, New Jersey, 2002.

International Search Report and Written Opinion in PCT/US2019/051874 dated Dec. 13, 2020; 9 pages.

Raza, Rana Hammad "Three Dimensional Localization and Tracking for Site Safety Using Fusion of Computer Vision and RFID," 2013, Dissertation, Michigan State University.

Notice of Allowance in U.S. Appl. No. 15/416,379 dated Mar. 30, 2022.

Final Office Action in U.S. Appl. No. 15/259,474 dated Feb. 8, 2022.

Final Office Action in U.S. Appl. No. 15/861,414 dated Mar. 16, 2022.

Non-Final Office Action in U.S. Appl. No. 15/091,180 dated Sep. 1, 2021.

Ex Parte Quayle Action in U.S. Appl. No. 15/416,379 mailed on Oct. 5, 2021.

Non-Final Office Action in U.S. Appl. No. 15/259,474 dated Aug. 26, 2021.

(56) References Cited

OTHER PUBLICATIONS

Non-Final Office Action in U.S. Appl. No. 15/861,414 dated Aug. 26, 2021.
Final Office Action in U.S. Appl. No. 16/575,837 dated Sep. 3, 2021.
Notice of Allowance in U.S. Appl. No. 15/091,180 dated Sep. 21, 2022.
Brown, Matthew and David G. Lowe "Automatic Panoramic Image Stitching using Invariant Features," International Journal of Computer Vision, vol. 74, No. 1, pp. 59-73, 2007.
Hill, et al. "Package Tracking Systems and Methods" U.S. Appl. No. 15/091,180, filed Apr. 5, 2016.
Piotrowski, et al. "Light-Based Guidance for Package Tracking Systems" U.S. Appl. No. 15/416,379, filed Jan. 26, 2017.
Final Office Action in U.S. Appl. No. 15/416,379, dated May 13, 2021; 18 pages.
Notice of Allowance and Fees Due in U.S. Appl. No. 16/437,767, dated May 14, 2021; 8 pages.
Non-Final Office Action in U.S. Appl. No. 16/575,837, dated Apr. 21, 2021; 18 pages.
Final Office Action in U.S. Appl. No. 16/206,745 dated Feb. 5, 2020; 15 pages.
Non-Final Office Action in U.S. Appl. No. 16/206,745 dated Oct. 18, 2019; 8 pages.
Final Office Action in U.S. Appl. No. 15/416,366 dated Oct. 7, 2019; 14 pages.
Non-Final Office Action in U.S. Appl. No. 15/416,366 dated Apr. 6, 2020; 13 pages.
Final Office Action in U.S. Appl. No. 15/416,379 dated Jan. 27, 2020; 15 pages.
Non-Final Office Action in U.S. Appl. No. 15/416,379, dated Jun. 27, 2019; 12 pages.
Final Office Action in U.S. Appl. No. 15/259,474 dated Jan. 10, 2020; 19 pages.
Non-Final Office Action in U.S. Appl. No. 15/861,414 dated Apr. 6, 2020; 14 pages.
Morbella N50: 5-inch GPS Navigator User's Manual, Maka Technologies Group, May 2012.
Final Office Action in U.S. Appl. No. 16/206,745 dated May 22, 2019; 9 pages.
Non-Final Office Action in U.S. Appl. No. 16/206,745 dated Jan. 7, 2019; 10 pages.
Non-Final Office Action in U.S. Appl. No. 15/416,366 dated Jun. 13, 2019; 11 pages.
Non-Final Office Action in U.S. Appl. No. 15/259,474 dated May 29, 2019; 19 pages.
Notice of Allowance in U.S. Appl. No. 15/270,749 dated Oct. 4, 2018; 5 pages.
Li, et al. "Multifrequency-Based Range Estimation of RFID Tags," IEEE International Conference on RFID, 2009.
Non-Final Office Action in U.S. Appl. No. 15/270,749 dated Apr. 4, 2018; 8 pages.
"ADXL202/ADXL210 Product Sheet," Analog.com, 1999.
Farrell & Barth, "The Global Positiong System & Interial Navigation", 1999, McGraw-Hill; pp. 245-252.
Grewal & Andrews, "Global Positioning Systems, Inertial Nagivation, and Integration", 2001, John Weiley and Sons, pp. 252-256.
Jianchen Gao, "Development of a Precise GPS/INS/On-Board Vehicle Sensors Integrated Vehicular Positioning System", Jun. 2007, UCGE Reports No. 20555.
Goodall, Christopher L., "Improving Usability of Low-Cost INS/GPS Navigation Systems using Intelligent Techniques", Jan. 2009, UCGE Reports No. 20276.
Debo Sun, "Ultra-Tight GPS/Reduced IMU for Land Vehicle Navigation", Mar. 2010, UCGE Reports No. 20305.
Adrian Schumacher, "Integration of a GPS aised Strapdown Inertial Navigation System for Land Vehicles", Master of Science Thesis, KTH Electrical Engineering, 2006.
Jennifer Denise Gautier, "GPS/INS Generalized Evaluation Tool (Giget) for the Design and Testing of Integrated Navigation Systems", Dissertation, Stanford University, Jun. 2003.
Farrell, et al., "Real-Time Differential Carrier Phase GPS=Aided INS", Jul. 2000, IEEE Transactions on Control Systems Technology, vol. 8, No. 4.
Filho, et al., "Integrated GPS/INS Navigation System Based on a Gyrpscope-Free IMU", DINCON Brazilian Conference on Synamics, Control, and Their Applications, May 22-26, 2006.
International Search Report & Written Opinion in international patent application PCT/US 12/64860, dated Feb. 28, 2013; 8 pages.
Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).
Non-Final Office Action in U.S. Appl. No. 15/091,180, dated Jun. 27, 2019; 11 pages.
Restriction Requirement in U.S. Appl. No. 15/091,180 dated Mar. 19, 2019; 8 pages.
Final Office Action in U.S. Appl. No. 15/091,180 dated Jan. 23, 2020; 17 pages.
Corrected Notice of Allowability in U.S. Appl. No. 15/270,749 dated Oct. 30, 2018; 5 pages.
Non-Final Office Action in U.S. Appl. No. 16/437,767, dated Jul. 15, 2020; 19 pages.
Notice of Allowance in U.S. Appl. No. 15/416,366 dated Aug. 19, 2020; 13 pages.
Final Office Action in U.S. Appl. No. 15/091,180, dated Mar. 10, 2021; 24 pages.
Notice of Allowance and Fees Due in U.S. Appl. No. 16/206,745, dated Mar. 12, 2021; 9 pages.
Final Office Action in U.S. Appl. No. 15/259,474, dated Mar. 9, 2021; 23 pages.
Final Office Action in U.S. Appl. No. 15/861,414 dated Feb. 8, 2021.
Final Office Action in U.S. Appl. No. 16/437,767 dated Feb. 5, 2021.
Non-Final Office Action in U.S. Appl. No. 15/091,180 dated Oct. 1, 2020.
Non-Final Office Action in U.S. Appl. No. 16/206,745 dated Sep. 23, 2020.
Non-Final Office Action in U.S. Appl. No. 15/416,379 dated Oct. 2, 2020.
Non-Final Office Action in U.S. Appl. No. 15/259,474, dated Sep. 1, 2020; 17 pages.
Final Office Action in U.S. Appl. No. 15/861,414 dated Nov. 17, 2020.
Non-Final Office Action in U.S. Appl. No. 15/861,414 dated Dec. 16, 2022.

* cited by examiner

COMPUTER-VISION-BASED OBJECT TRACKING AND GUIDANCE MODULE

CROSS-REFERENCE TO RELATED APPLICATION

This application is a continuation of U.S. application Ser. No. 16/740,679, titled "Computer-Vision-Based Object Tracking and Guidance Module," filed on Jan. 13, 2020, which claims priority to and the benefit of U.S. Provisional Application No. 62/791,413, titled "Computer Vision Tracking and Guidance Module", filed on Jan. 11, 2019, the entirety of each of which is incorporated by reference herein for all purposes.

FIELD OF THE INVENTION

The invention relates generally to computer-vision-based object tracking and guidance apparatuses.

BACKGROUND

E-commerce continues to see significant year-over-year growth and is expected do so for the foreseeable future. Many such online retailers ship purchased goods to a customer's front door. With the rise of "porch pirates", though, namely, people who steal packages off from customers' porches or front door areas, many customers want their online orders shipped to a store, where the purchased goods await their pickup. This process has the further advantage of saving money on shipping costs. Retailers are thus leveraging their brick-and-mortar stores to fulfill online sales, which increases customer foot traffic at their sites, wins more customers, and results in more volume.

Retailers, however, are not equipped to efficiently handle in-store pickups. Most buy-online-pickup-in store (BOPIS) solutions are expensive and require additional staff or significant changes in operation. A poorly designed pickup process can cause delay and frustrate customers. Once a customer has had a bad pickup experience, he or she is unlikely to try in-store pick-up again. Other self-pickup solutions, such as package lockers and package towers are expensive, restrictive, fixed, and take up space, and staffing a pickup counter takes staff away from the business of selling or other more productive business operations.

SUMMARY

All examples and features mentioned below can be combined in any technically possible way.

In one aspect, the invention is related to an apparatus comprising a mount body by which to secure the apparatus to a structure and a camera assembly fixed to the mount body. The camera assembly includes an image sensor that captures images within its field of view. The apparatus further comprises a lighting assembly rotatably connected to the mount body. The lighting assembly houses one or more light sources including a directional light source secured to a laser assembly. A control-board assembly, fixed to the mount body, houses control boards that are in electrical communication with the camera assembly to acquire the images captured by the image sensor and with the lighting assembly to control operation of the one or more light sources. The control boards include one or more processors configured to acquire information about an object, to associate a location within the field of view of the image sensor with the object, to point light emitted by the directional light source at the location associated with the object by rotating the lighting assembly and turning the laser assembly, and, based on an image acquired from the camera assembly, to detect change within the field of view of the image sensor corresponding to placement or removal of the object.

In some embodiments, the camera assembly further comprises a depth sensor fixed to a mounting surface and a plurality of support mounts of different heights attached to a frame of the camera assembly, and the image sensor is mounted to a board held by the plurality of support mounts at a non-zero offset angle relative to the mounting surface upon which the depth sensor is fixed. The support mounts can have rivet holes, and the camera assembly can further comprise push rivets that pass through the board into the rivet holes of the support mounts to secure the image sensor within the camera assembly.

In some embodiments, the mount body has a channel extending therethrough. The channel has opposing upper and lower surfaces and a side wall therebetween. The sidewall has two angled surfaces that determine a full range of angles at which the mount body can be mounted to a rail. One of the surfaces of the channel has a retaining boss extending therefrom. The retaining boss is located on the one surface to align with a groove of the rail. The retaining boss has a size that fits closely within the groove of the rail. The apparatus may further comprise a bracket with two arms and a mounting surface, and a channel bar attached between ends of the two arms. The channel bar has dimensions adapted to fit closely within and pass through the channel of the mount body. In another embodiment, the bracket has two opposing walls and a sidewall disposed therebetween, and the mount body includes a pair of flanges, one flange of the pair on each side of the mount body, each flange having an opening therein. A first wall of the two walls of the bracket enters the channel of the mount body and has openings that align with the openings of the flanges for receiving fasteners therethrough that secure the first wall to the flanges. A second wall of the two walls has openings therein for receiving fasteners therethrough that secure the second wall to a surface.

In another aspect, the invention is related to an apparatus comprising a mount body, a lighting assembly, attached to the mount body, that houses a directional light source, and a camera assembly, attached to the mount body, that houses an RGB (read green blue) camera and a depth camera that capture image information within their fields of view. The camera assembly has a mounting surface upon which the depth camera is fixed and a plurality of support mounts of different heights attached to a frame of the camera assembly. The RGB camera is mounted to a board supported by the plurality of support mounts of different heights and held at a non-zero offset angle relative to the mounting surface upon which the depth camera is fixed. The apparatus further comprises a control-board assembly that is attached to the mount body. The control-board assembly is in communication with the camera assembly to receive image information captured by the cameras and with the lighting assembly to control operation of the directional light source. The control-board assembly houses control boards that include a processor configured to receive and process images captured by the camera assembly and to operate the directional light source in response to the processed images.

The support mounts may have rivet holes, and the camera assembly may further comprise push rivets that pass through the board into the rivet holes of the support mounts to secure the RGB camera within the camera assembly. The mount body may have a channel extending therethrough. The channel has opposing upper and lower surfaces and a side wall therebetween. The sidewall has two angled surfaces that determine a full range of angles at which the mount body can be mounted to a rail. One of the surfaces of the channel may have a retaining boss extending therefrom. The retaining boss is located and sized to align with and fit within a groove of the rail.

The apparatus may further comprise a bracket with two arms that meet at a mounting surface, and a channel bar attached between ends of the two arms. The channel bar has dimensions adapted to fit closely within and pass through the channel of the mount body. In another embodiment, the bracket has two opposing walls and a sidewall disposed therebetween, and the mount body includes a pair of flanges, one flange of the pair on each side of the mount body, each flange having an opening therein. A first wall of the two walls of the bracket enters the channel of the mount body and has openings that align with the openings of the flanges for receiving fasteners therethrough that secure the first wall to the flanges. A second wall of the two walls has openings therein for receiving fasteners therethrough that secure the second wall to a surface.

In another aspect, the invention is related to an apparatus comprising a mount body by which to secure the apparatus to a rail. The mount body has a channel sized to receive the rail therethrough. The channel has a sidewall disposed between opposing walls. The sidewall has multiple angled surfaces that determine a full range of angles at which the rail can be secured to the mount body. The apparatus further comprises a camera assembly housing a camera, a light-guidance assembly, and a control-board assembly. The camera assembly is attached to the mount body such that the camera has a field of view that faces downwards when the apparatus is secured to the rail. The light-guidance assembly is rotatably attached to the mount body and houses one or more light sources. The control-board assembly is attached to the mount body and is in communication with the camera assembly to receive image information captured by the cameras and with the lighting assembly to control operation of the one or more light sources. The control-board assembly houses control boards configured to receive and process images captured by the camera assembly and to rotate the light-guidance assembly and operate the one or more light sources in response to the processed images.

One of the surfaces of the channel may have a retaining boss extending therefrom. The retaining boss is located and sized to align with and fit within a groove of the rail.

The apparatus may further comprise a bracket with two arms that end at a mounting surface, and a channel bar attached between ends of the two arms. The channel bar has dimensions adapted to fit closely within and pass through the channel of the mount body. In an alternative embodiment, the bracket has two opposing walls and a sidewall disposed therebetween, and the mount body includes a pair of flanges, one flange of the pair on each side of the mount body, each flange having an opening therein. A first wall of the two walls of the bracket enters the channel of the mount body and has openings that align with the openings of the flanges for receiving fasteners therethrough that secure the first wall to the flanges. A second wall of the two walls has openings therein for receiving fasteners therethrough that secure the second wall to a surface.

In some embodiments, the camera assembly has a depth sensor fixed to a mounting surface and a plurality of support mounts of different heights attached to a frame of the camera assembly, and wherein the image sensor is mounted to a board supported by the plurality of support mounts and held at a non-zero offset angle relative to the mounting surface to which the depth sensor is fixed. The support mounts may have rivet holes, and the camera assembly may further comprise push rivets that pass through the board into the rivet holes of the support mounts to secure the image sensor within the camera assembly.

In one embodiment, the one or more light sources includes a directional light source fixed to a laser assembly, and the apparatus further comprises a first motor operably coupled to the lighting assembly to pan the directional light source horizontally and a second motor operably coupled to the laser assembly to tilt the directional light source vertically.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
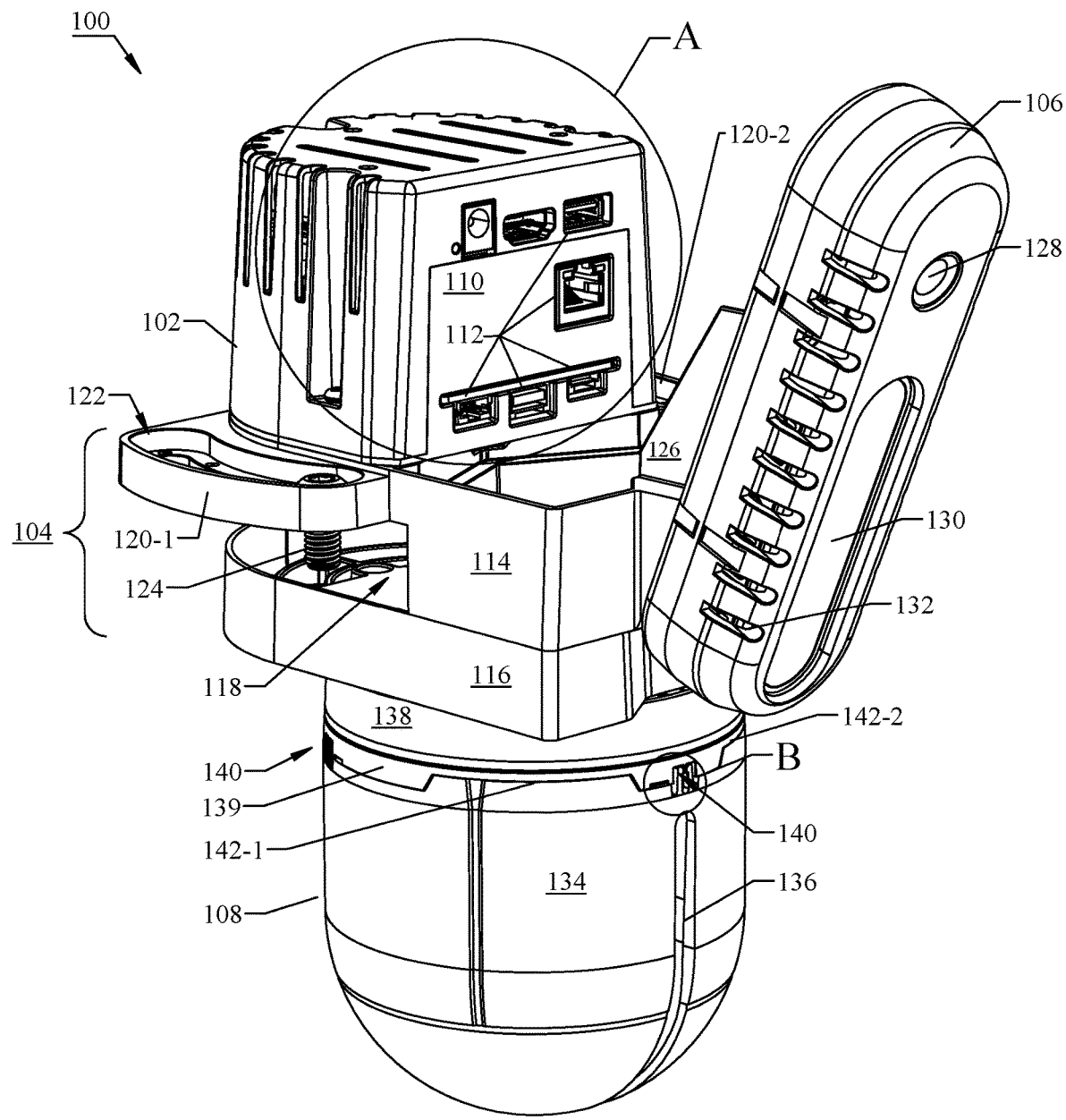
FIG. 1 is an isometric right-side view of an embodiment of a computer-vision-based object tracking and guidance module, including a control-board assembly, a camera assembly, a mount body, and a lighting assembly.

Computer-vision-based object tracking and guidance apparatuses described herein can be used to provide a secure, self-service, buy-online-pickup-in-store (BOPIS) solution without the aforementioned shortcomings of package lockers, package towers, and staffed pickup counters. Embodiments of such apparatuses or modules, as they are referred to herein, enable users to locate, identify, and pickup items, such as packages, using light and audio cues.

In brief overview, a module can register and track objects within a module's field of view and, additionally or alternatively, guide users to specific objects using light, audio, or both. In brief overview, the module is comprised of a computer-vision system connected to and controlling a guidance system. The computer-vision system includes an image sensor, a depth sensor, or both, connected to a data processing unit capable of executing image-processing algorithms. The guidance system contains a directional light source and a mechanical and/or electrical system for the operation and orienting of the directional light source or audio system.

During operation of the module, the data processing unit acquires information or data about an object. The information may include, for example, a product description, package dimensions, addressor and addressee data. A code reader may acquire the information from a label affixed to or adjacent the object and transmit that information to the module. This object may be in the process of being placed within or being picked up from the module's field of view, typically on a shelf or other support surface.

In the case of object placement, the guidance system can direct light at or illuminate the location where the object should be placed and/or play audio that instructs the user to where the object should be placed. The computer-vision system can then detect a presence and location of an object within the module's field of view based on changes detected in one or more images captured by the camera assembly and determine whether the placement of the object occurred as expected. If object placement is correct, the data-processing unit registers the object at the placement location. The module can further signify correct placement by illuminating a green light (LED), for example, or audibly announcing successful placement. Conversely, the module can further signify incorrect placement by illuminating a red light (LED), for example, or audibly announcing detection of an error.

In the case of picking up the object, the data-processing unit determines the registered location of the object being picked up based on the information acquired about the object, and the light-guidance system can direct light at or illuminate the object at that location or audibly direct a user to the location. The computer-vision system can then detect whether the object has been removed from that location based on changes detected in the one or more images captured by the camera assembly. From the captured images, the computer-vision system can also determine whether the wrong package has been removed. As in the instance of object placement, the module can use light-guidance (e.g., illuminate a red or green light) to signify success or failure.

Example applications of modules described herein can be found in U.S. Pat. No. 10,148,918, issued Dec. 4, 2018, in U.S. application Ser. No. 15/861,414, U.S. Pat. Pub. No. US20180197139, published Jul. 12, 2018, titled "Modular Shelving Systems for Package Tracking," and in U.S. application Ser. No. 15/259,474, U.S. Pat. Pub. No. US 20180068266, published Mar. 8, 2018, titled "System and Method of Object Tracking Using Weight Confirmation," the entirety of which U.S. patent and U.S. published patent applications are incorporated by reference herein for all purposes.

FIG. 1 shows an isometric right-side view of an embodiment of a computer-vision-based object tracking and guidance apparatus (hereafter, module) 100. The module 100 includes a control-board assembly 102 connected to a top side of a mount body 104, a camera assembly 106 connected to a front side of the mount body 104, and a lighting assembly 108 rotatably connected to a bottom side of the mount body 104. For ease of the following description, words such as left-side and right-side, forward and rearward, front and back, top and bottom, up and down, upper and lower, and horizontal and vertical are used arbitrarily based on the appearance of the module in the figures; such terms are not intended to limit the principles described herein or to require any specific arrangement of the various housing and assemblies on the module or any specific positioning of the module when deployed in the field. In one embodiment, the dimensions of the module 100 are approximately 260 mm×150 mm×225 mm.

The control-board assembly 102 has a panel 110 (encircled by circle A) with various electrical connectors 112 for communicating with control boards housed within the control-board assembly 102. In general, the control boards perform the operations of object registration, image processing, object tracking, and light guidance.

The mount body 104 has in the shown embodiment two joined sections: an upper mount section 114 and a lower mount section 116. The joined sections of the mount body form a channel 118 that receives a rail (not shown). The channel 118 is defined by opposing upper and lower interior surfaces of the upper and lower mount sections 114, 116, respectively, and a side wall disposed therebetween. This side wall has two angled surfaces (described in FIG. 6) that determine different angles at which the module 100 may be mounted to the rail. The upper mount section 114 has two mounting flanges 120-1, 120-2 (generally 120) on opposite sides of the section 114, each flange 120 having a kidney-shaped opening 122 through which a fastener 124 extends when attaching the module to the rail. The upper mount section 114 also has an arm 126 to which the camera assembly 106 is fastened. Although described as being two separable sections, sections of the mount body 104 may be one section of unitary, indivisible construction.

The camera assembly 106 has an RGB camera (i.e., image sensor) 128, a depth sensor 130, and side vents 132 that allow heat generated by the internal optical sensor(s) 128, 130 to leave the assembly. The RGB camera 128 provides color information, and the depth sensor 130 provides estimated depth for each pixel of a captured image. The slant of the raised arm 126 holds the camera assembly such that the field of view of the RGB camera 128 and that of the depth sensor 130 face forward and generally downwards. One embodiment of the camera assembly 106 has no depth sensor 130. References made herein to the field of view of the camera assembly or to the field of view of the module corresponds to the field of view of the camera 128 or to the intersection (i.e., overlap) of the fields of view of the camera 128 and depth sensor 130. In one embodiment, the camera 128 and depth sensor 130 are each capable of data acquisition at 3 meters, and the module 100 monitors a 4-foot wide by 8-foot high by 1.5-foot deep zone, depending on the distance of the module from its target viewing area and/or on the fields of view of the RGB camera and depth sensor. This zone is monitored for changes in depth and/or color. The control boards of the control-board assembly 102 are in communication with the camera and optional depth sensor (via wiring that runs from the camera assembly directly to a camera receptacle 202 (FIG. 2) to acquire the color and pixel information captured by these optical sensors. The RGB camera 128 can be an ELP 5megapixel USB camera module, manufactured by Ailipu Technology Co., Ltd of Shenzhen, Guangdong, China, and the depth camera can be an INTEL® REALSENSE™ Depth Camera D435, manufactured by Intel Corp, of Santa Clara, Calif.

The lighting assembly 108 has a translucent dome-shaped cover 134 with a frontally located slot 136. The slot 136 runs vertically along the side of the cover 134 and extends along the bottom (or crown) of the dome-shaped cover 134. Directed light (e.g., laser), when activated, originates from within the lighting assembly and passes through this slot 136 in a direction determined by the electronics on the control boards of the control-board assembly 102. The control boards are in communication with one or more light sources (not shown) in the lighting assembly (via wiring that runs from the lighting assembly, through the mount body, and into an opening in the base of the control-board assembly), to control each light source in order to provide light guidance to certain objects or areas within the field of view of the camera assembly 106, depending upon the object or region of interest. A pan pivot base 138 is fixed to the lower mount section 116.

The lighting assembly 108 further comprises a laser tilt base 139 which is rotatably coupled to the pan pivot base 138. The dome-shaped cover 134 is removably secured to the laser tilt base 139 by three snap hooks 140 (only two are visible in FIG. 1). The snap hooks 140 are evenly spaced (120 degrees apart) around the circumference of the laser tilt base 139 and the dome-shaped cover 134. One of the latches 140 (surrounded by circle B) is directly in line with the laser slot 136.

The dome-shaped cover 134 has three tabs (of which tabs 142-1 and 142-2 (generally, 142) are shown). The third tab is located on the far side of the dome-shaped cover, directly opposite the laser slot. The two tabs 142-1, 142-2 are spaced 135 degrees apart from the far side tab, one on either side of the third tab. The uneven spacing between the tabs ensures there is only one way to attach the cover 134 to the laser tilt base 139, to ensure correct assembly of the dome-shaped cover. The dome-shaped cover 134 is effectively keyed by its three indexing tabs 142.

When the laser slot 136 faces forward, in line with the camera assembly 106, the laser tilt base 139 is considered to be at center. The rotatable laser tilt base 139 can rotate a total of 60°; 30° to either side of center. When the laser tilt base 139 rotates, the internally located laser (not shown) and the dome-shaped cover rotates with it, thereby changing the direction in which the laser points and towards which the laser slot faces.

When deployed for operation, the module 100 is mounted in a fixed position with its RGB camera 128 and optional depth camera 130 facing a target area of interest, for example, a supporting surface or an object-holding area. Examples of the supporting surface include, but are not limited to, desktops. tables, shelves, and floor space. The object-holding area can be in a store, supermarket, warehouse, business enterprise, inventory, room, closet, hallway, cupboards, lockers, each with or without secured access. Examples of identified and tracked objects include, but are not limited to, packages, parcels, boxes, equipment, tools, food products, bottles, jars, and cans. (People may also be identified and tracked.) Each separate optical sensor 128, 130 has its own perspective of the area and of the objects placed on the supporting surface.

Modules 100 may be adjustably mounted, for example, on a sliding rail in a surveillance configuration so that all corners of an enterprise are covered. Although particularly suited for mounting to an overhead rail, modules can also be secured to other types of structures, for example, walls, posts, shelves, and pillars. In general, these modules are small and non-intrusive and can track the identifications and paths of individuals through the enterprise, for example, as described in U.S. Pat. Pub. No. US-2018-0164103-A1, published Jun. 14, 2018, titled "System and Method of Personalized Navigation inside a Business Enterprise," the entirety of which application is incorporated by reference herein.

Figure 2:
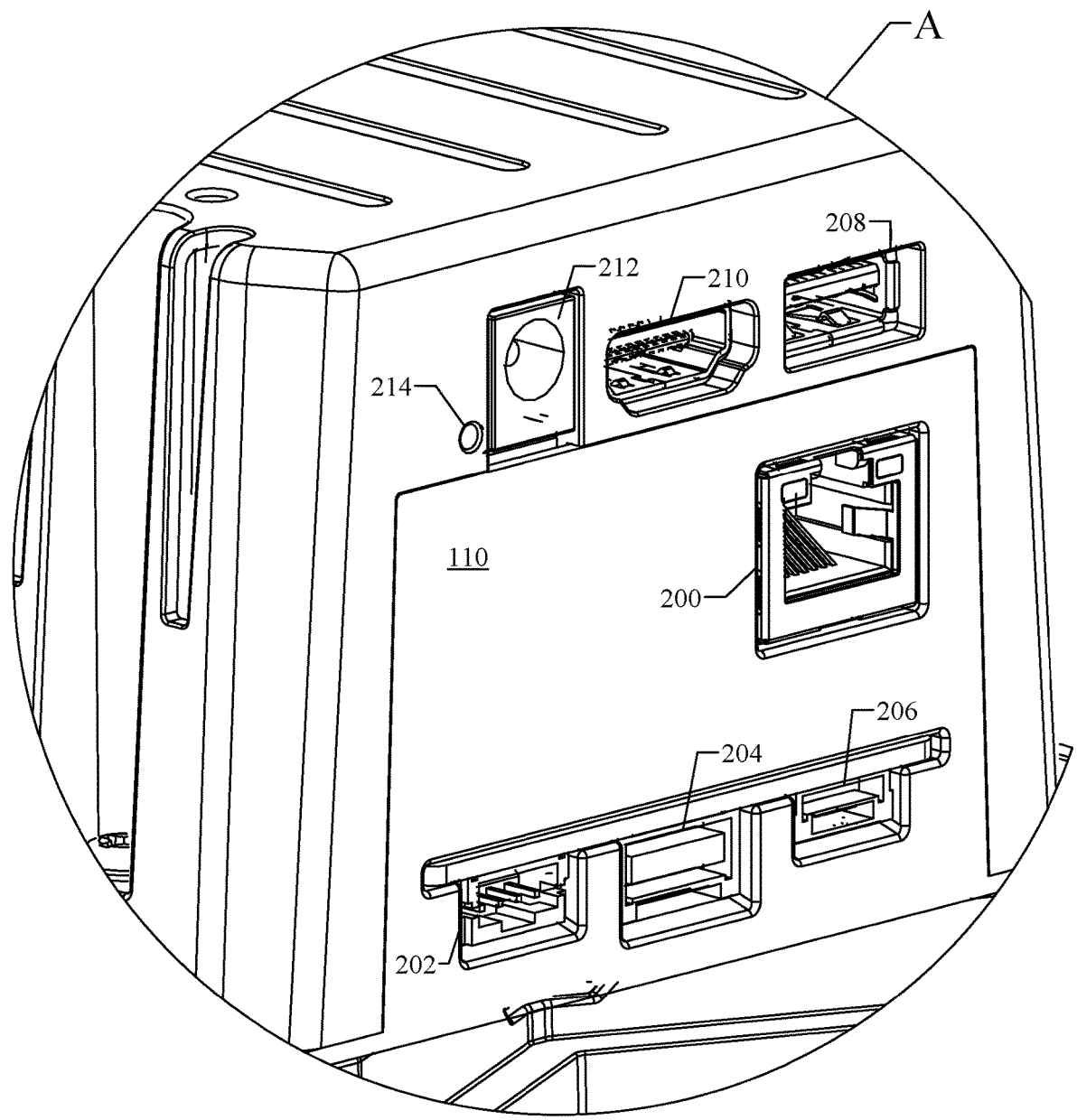
FIG. 2 is a detail view of a panel on one side of the control-board assembly of FIG. 1.

FIG. 2 shows a detail view of the region surrounded by the circle A in FIG. 1, which includes the panel 110 on one side of the control-board assembly 102. The panel 110 has ports for various electrical receptacles, including a POE+ (power over Ethernet) port 200 for Internet communications, an RGB camera receptacle 202, a motor/optical sensor receptacle 204, a lighting assembly receptacle 206, and a depth sensor receptacle 208.

By the POE+ port 200, also called an RJ45 receptacle, the module 100 can be added to a network and remotely communicated with over the Internet. For example, over a network connection, the module may communicate with one or more servers (i.e., server system), which may perform third-party services, such as "cloud services" for the module. As used herein, the "cloud" refers to software and services that run on a remote network, such as the Internet. In addition, power is supplied to the module by the POE+ connection and other operations can be performed, for example firmware updates, and remote troubleshooting.

Through the RGB camera receptacle 202, a device (e.g., computer) may communicate with and operate the camera 128. The motor/optical sensor receptacle 204 allows a device to communicate with and control pan and tilt stepper motors and optical sensor boards for pan and tilt motion of a laser gimbal (see 1310 in FIG. 13). Through the lighting assembly receptacle 206, communications can be had directly with the directional light source and light-emitting diodes housed within the lighting assembly 108, to test their operation.

Above the RJ45 receptacle 200 are the depth sensor receptacle 208, an HDMI (High-definition Multimedia Interface) port 210, a 5 v DC power input port 212, and a power button 214. The depth sensor receptacle 208 enables communication with the depth sensor 130 of the camera assembly 106. By the HDMI port 210, the module 100 can transmit streams of audio and video to another device (e.g., a high-definition television or display). The power button 214 turns power on and off to the processor board (not shown) within the control-board assembly 102.

Figure 3:
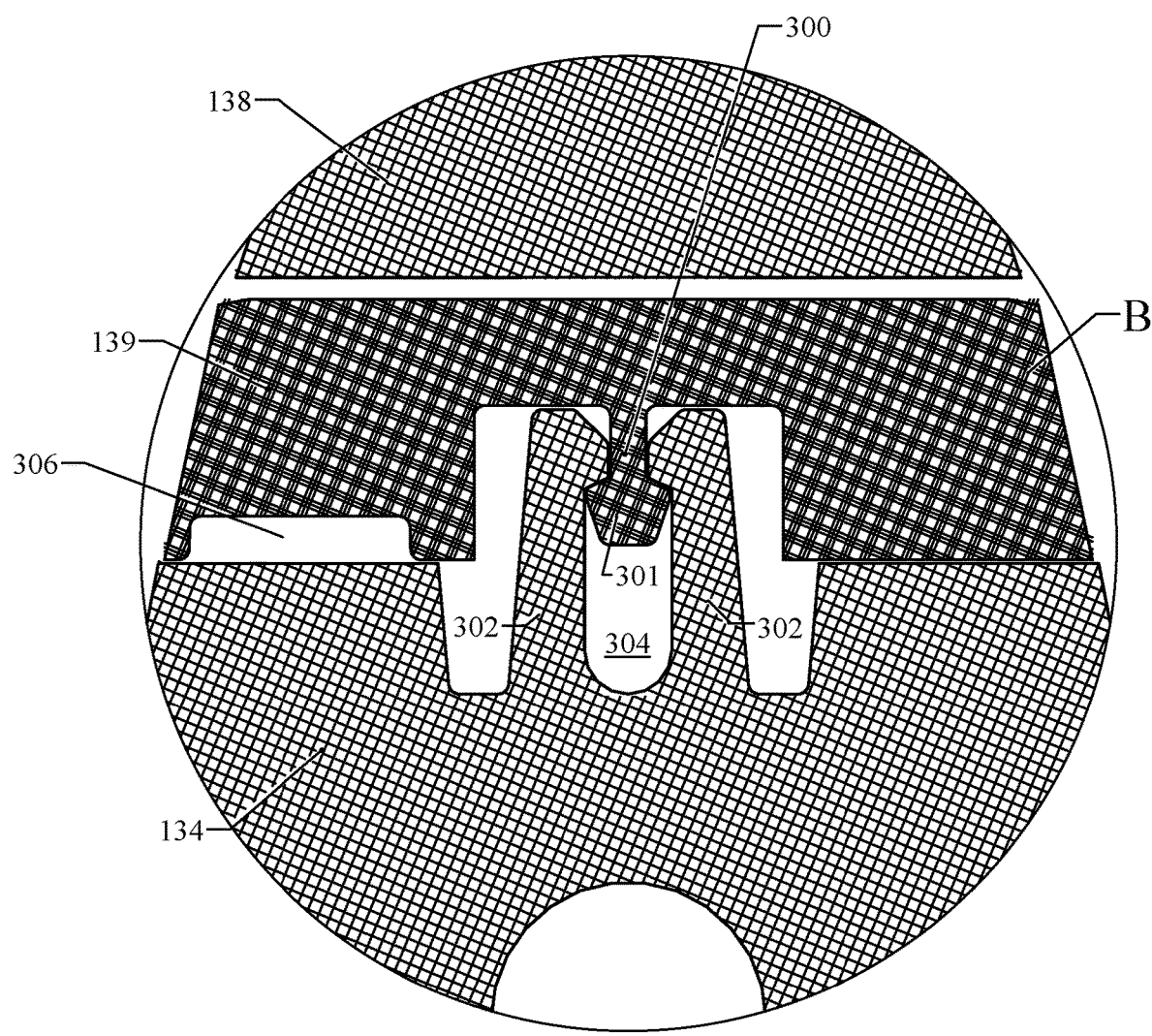
FIG. 3 is a detail view of a snap hook used to join a dome-shaped cover of the lighting assembly with a laser tilt base.

FIG. 3 shows a detail view of the region surrounded by circle B in FIG. 1. A pin 300 extends from a receded edge of the laser tilt base 139. The pin 300 ends with a tip 301 that is larger than the diameter of the pin's needle. Located on the base edge of the dome-shaped cover 134 is a pair of opposing, resilient snap hooks 302 with a gap 304 therebetween positioned to receive the tip of the pin 300 (when the dome-shaped cover 134 is properly aligned with the laser tilt base 139). The hook-ends of the snap hooks lean toward each other and form a V-shape entry for guiding the tip of the pin into the gap. As the tip of the pin 300 enters the gap 304 between snap hooks 302, the tip urges the two snap hooks 302 away from each other. When the tip has fully entered the gap, the snap hooks 302 snap towards each other, grasping the pin at the neck just behind the tip. The edge of the laser tilt base 139 meets with the edge of the dome-shaped cover 134 when the tip of the pin has fully entered the gap between the snap hooks. A slot 306 to the left of each snap hook is used to disconnect the dome-shaped cover 134 by inserting and rotating the flat end of a screwdriver, forcing the snap hooks to disengage and release.

Figure 4:
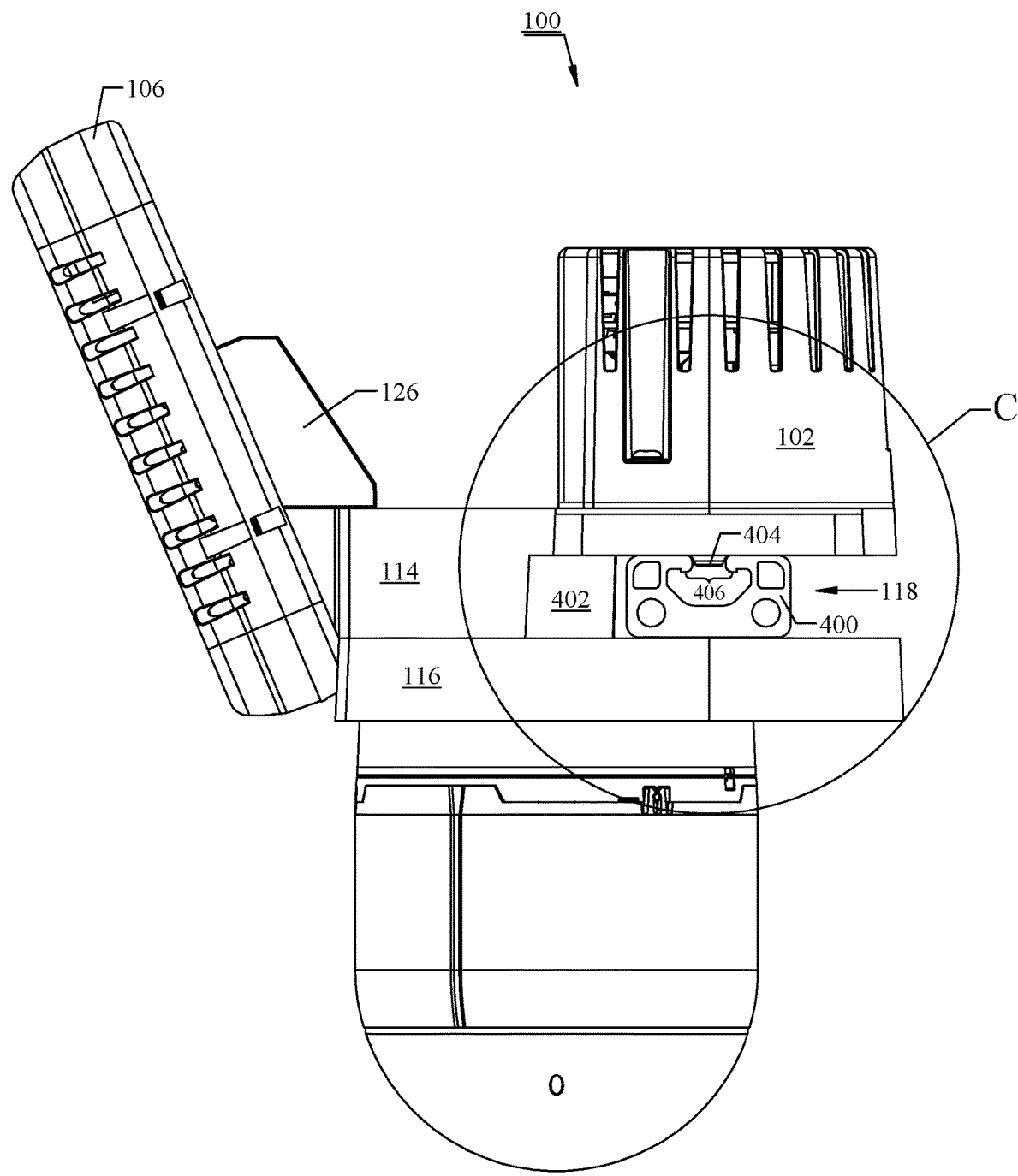
FIG. 4 is a left side view of the embodiment of the module of FIG. 1 secured to a mounting rail.

FIG. 4 shows a left side view of the module 100 having a mounting rail 400 (cross-section shown) disposed in the channel 118 defined by the upper and lower mount sections 114, 116, respectively, of the mount body 104. The upper mount section 114 has two angled surfaces that provide hard stops for determining the angle installation range of the mounting rail 400. Only one of the two angled surfaces 402 is visible in FIG. 4; the other angled surface is on the other side of the mount body 104, opposite and symmetric to the visible angled surface 402. A retaining boss 404 extends into the channel 118 from a surface of the upper mount section 114. The mounting rail 400 has a lengthwise groove 406; the retaining boss 404 is sized to fit closely within the groove 406 when one end of the rail 400 enters and slides through the channel 118. Disposed above the upper mount section 114, directly above where the rail 400 passes through the channel 118, is the control-board assembly 102; the placement of the control-board housing 102 provides room for the wiring that comes up through the module without the wiring having to rotate and bend.

Extending from the upper mount section 114 is the arm 126 of the mount body 104. In this embodiment, the arm 126 holds the camera assembly 106 at a fixed downwards facing slant. The downward-facing slant accommodates the installation of such modules at an elevated position relative to the object-holding area, to place as much of the object-holding area as possible within the fields of view of the cameras 128, 130 housed in the camera assembly 106. In another embodiment, the arm 126 is movable to allow for a manual or automated change in the mounting angle of the camera assembly.

Figure 5:
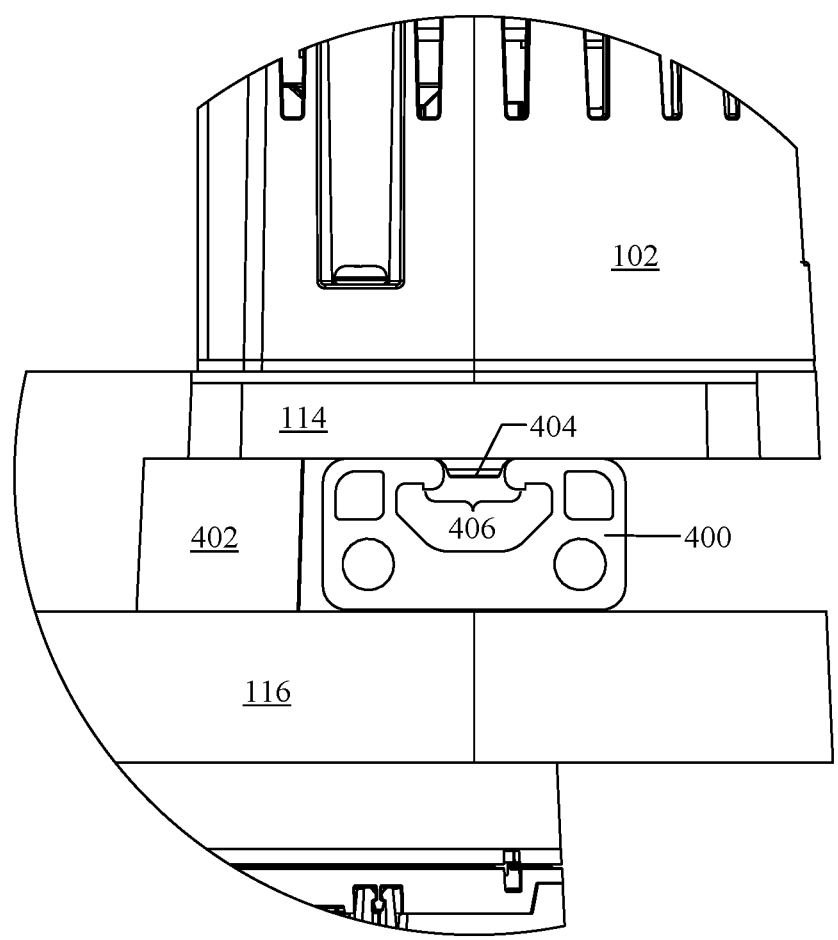
FIG. 5 is a diagram of the region of the module that secures to the mounting rail.

FIG. 5 shows a detail view of the region surrounded by circle C in FIG. 4, the region in which the module 100 is secured to the mounting rail 400. In general, the rail 400 is fixed at a location in front of or alongside of the object-holding area and is of sufficient length to ensure that installation of the module at any location along the rail will achieve the desired coverage of the object-holding area in the field of view of the camera assembly. The width of the rail 400 is small enough to fit within the channel 118 of the mount body 104. The retaining boss 404 projects into the groove 406 of the mounting rail 400. The retaining boss guides and holds the mounting rail 400 to the module before screws 124 (FIG. 1) pass through the flanges 120 (FIG. 1) of the mount body 104 into T-nuts in the rail and tighten to hold the module 100 in place.

Figure 6:
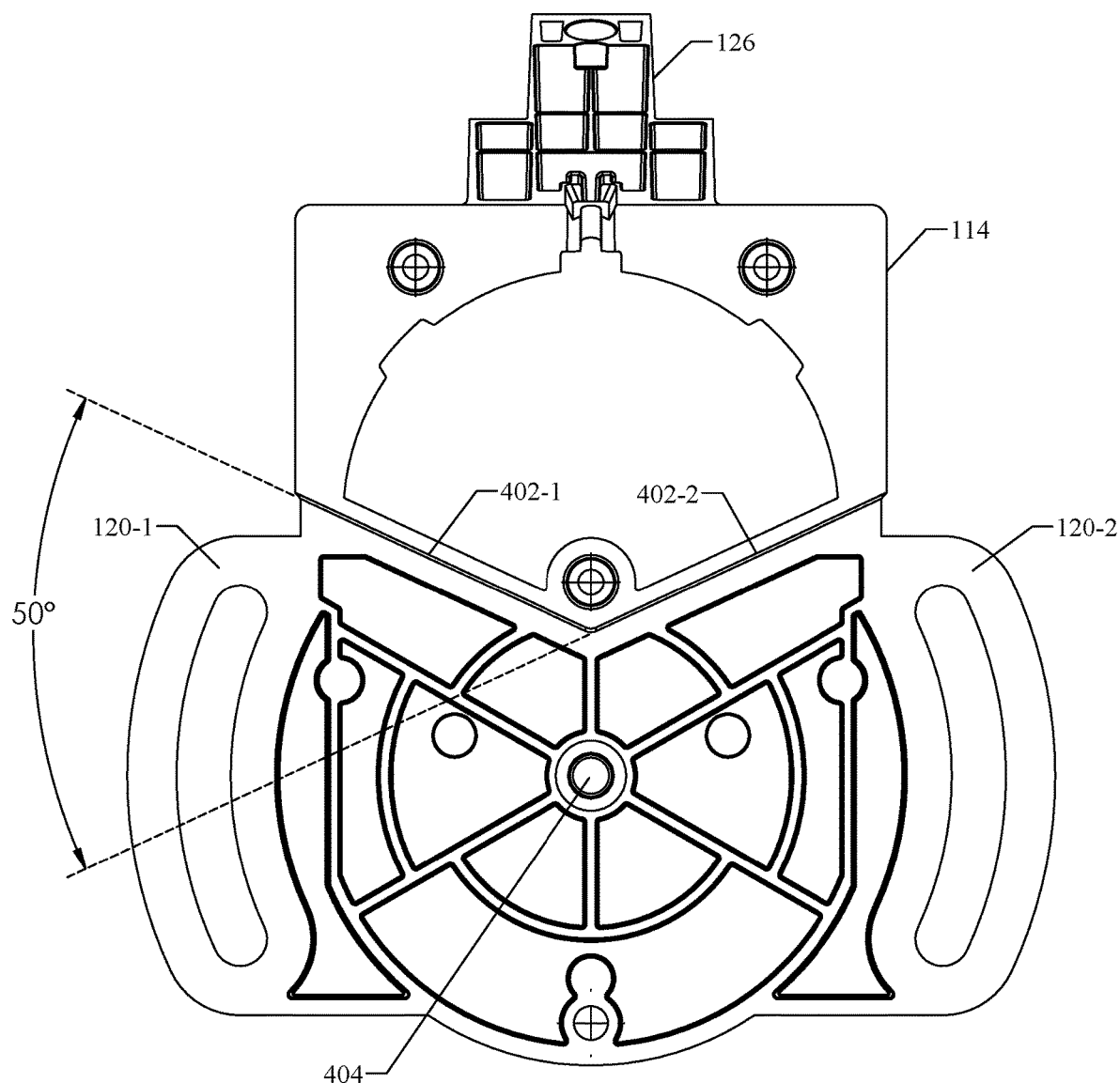
FIG. 6 is bottom view of a section of the mount body having two angled surfaces that determine the range of possible angles at which the module can attach to the mounting rail.

FIG. 6 shows a bottom view of the upper mount section 114 with the two angled surfaces 402-1, 402-2 (generally, 402). The angled surfaces 402 are offset from each other by 50 degrees. These surfaces 402 determine the range of possible angles at which the module 100 can attach to the mounting rail 400. The retaining boss 404 resides generally central to that half of the upper mount section 114 that secures to the rail 400.

Figure 7:
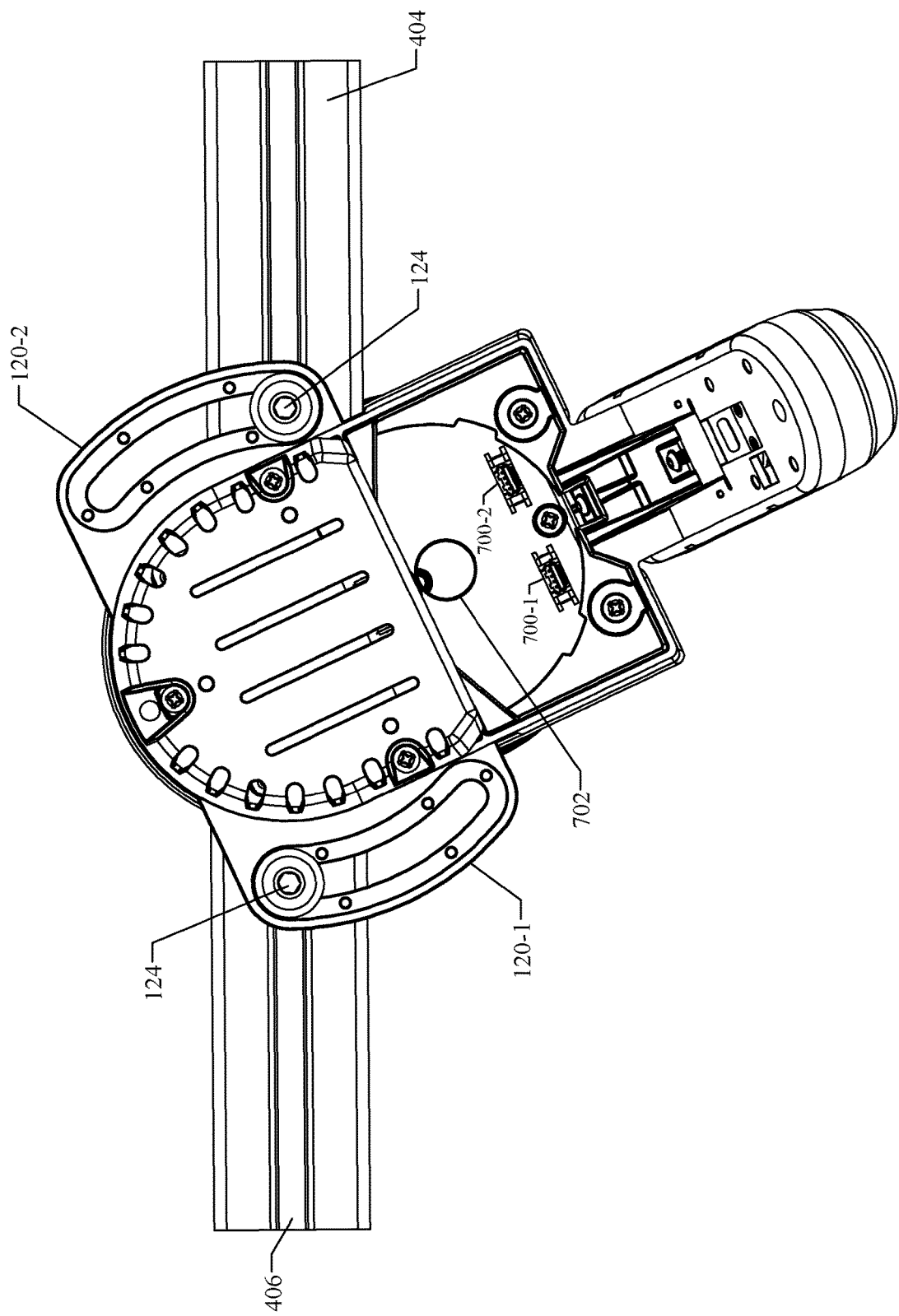
FIG. 7 is a top-down view of the module mounted on the rail at a first angle (e.g., −25 degrees) for the camera assembly to be directionally pointed towards the module's left.

FIG. 7 shows a top-down view of the module 100 mounted on the rail 400 at a first angle (here, −25 degrees) for the camera assembly 106 to be directionally pointed towards the module's left. When the module is mounted at the angle shown, the side of the rail 400 rests flush against the angled surface 402-2 (FIG. 6). Mounting screws 124 secure the module to the rail 400, each screw entering the same groove 406 in the rail as the retaining boss 404 (FIG. 4). Rectangular receptacles 700-1 and 700-2 connect to the pan motor and optical sensor board wiring (described in FIG. 18). A large circular opening 702 in the mount body is for wiring to pass through for the LED board, laser, tilt motor, and optical sensor board that are part of the lighting assembly 108, as described in connection with FIG. 12.

Figure 8:
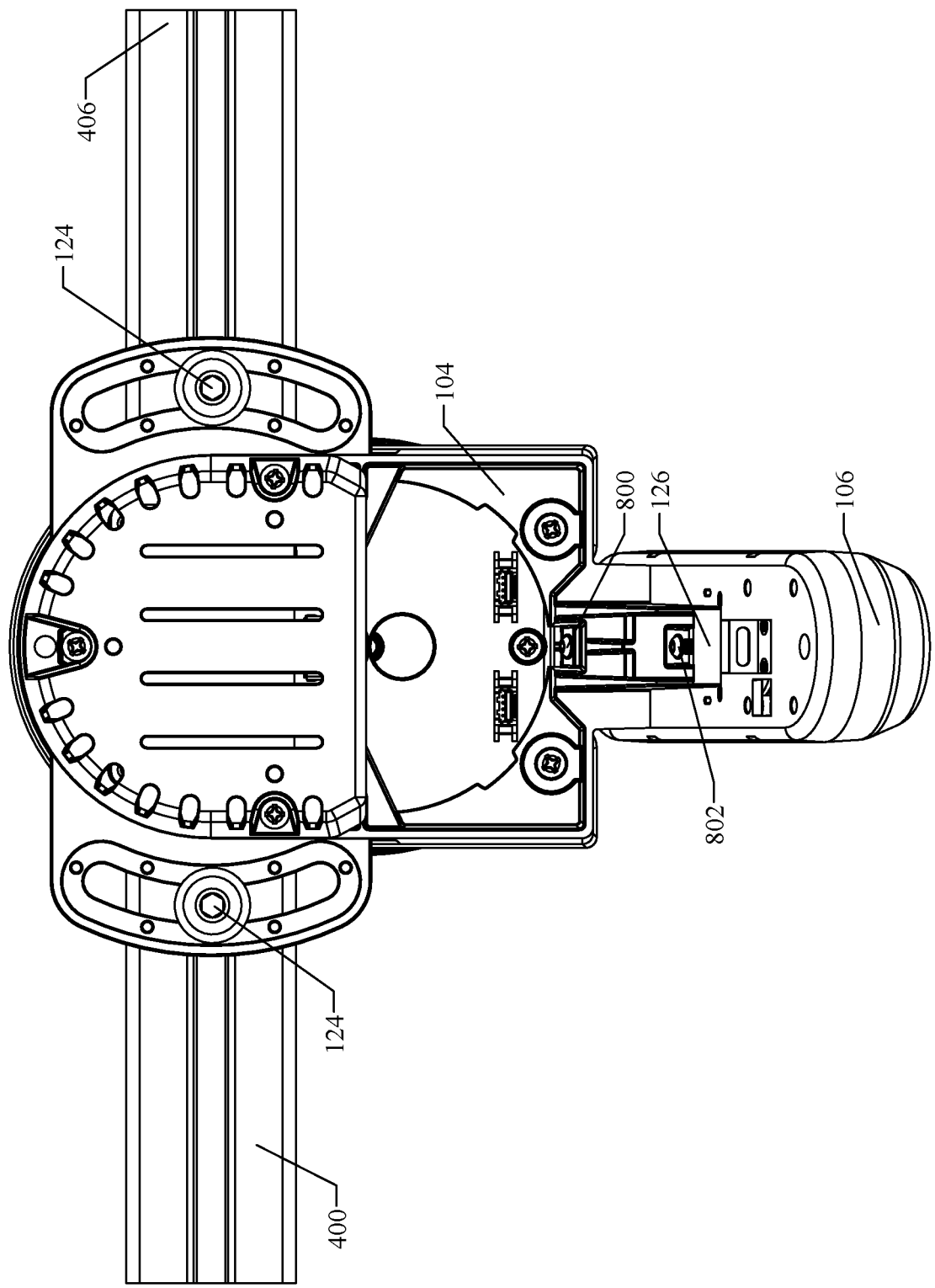
FIG. 8 is a top-down view of the module mounted on the rail at a second angle (e.g., 0 degrees) for the camera assembly to be directionally pointed forward of the module.

FIG. 8 shows a top-down view of the module 100 mounted on the rail 400 at a second angle (e.g., 0 degrees) wherein the camera assembly 106 is directionally pointed forward of the module. In this position, the rail 400 tangentially touches the point of intersection between the two angled surfaces 402-1, 402-2 (FIG. 6). To secure the mounting rail 400 in this position, the mounting screws 124 are centrally located in the flanges' kidney-shaped openings 122. The ends of the screws enter the rail groove 406. Fasteners 800, 802 (e.g., screws) secure the arm 126 to the camera assembly 106.

Figure 9:
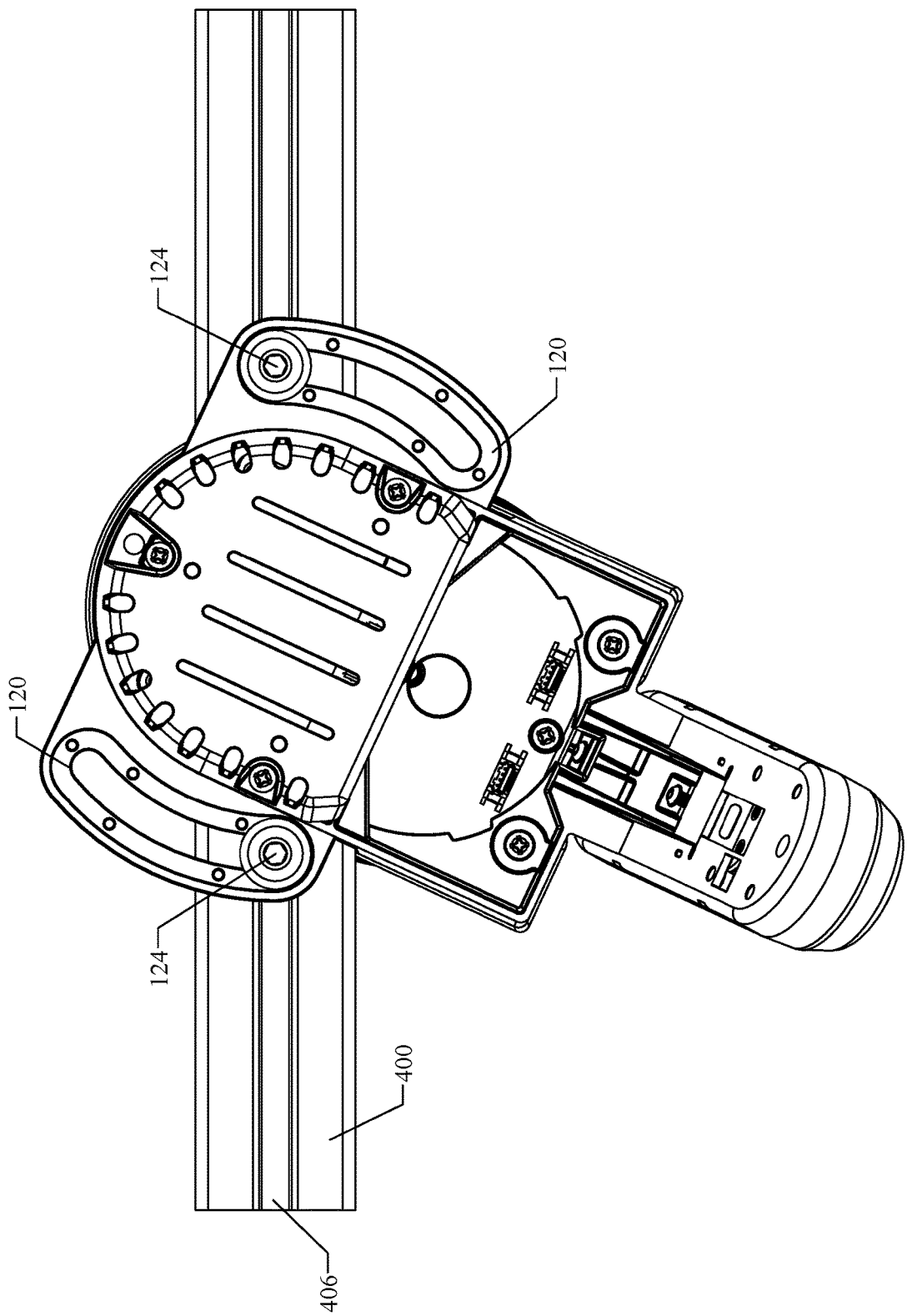
FIG. 9 is a top-down view of the module mounted on the rail at a third angle (e.g., 25 degrees) for the camera assembly to be directionally pointed towards the module's right.

FIG. 9 shows a top-down view of the module 100 mounted on the rail 400 at a third angle (e.g., 25 degrees) at which the camera assembly 106 is directionally pointed towards the module's right. Mounting screws 124 pass through the flanges 120 and secure the module to the rail 400. Each screw enters the same groove 406 in the rail as the retaining boss (not shown).

With the module mounted in this position, the rail 400 rests flush against the angled surface 402-1 (FIG. 6). The module can be installed at any angle between those shown in FIG. 6 and FIG. 8, its full range being 50 degrees. The different mounting angles allow the module to be placed anywhere along the mounting rail in front of a shelf and have a field of view that covers the shelf. For example, consider a mounting rail that runs parallel to the full width of shelving in front of it. A module facing the shelving and mounted on the far left of the rail (and thus of the shelving) can be angled to face towards the right; a module mounted at the center of the rail can be angled to face forward; and a module mounted at the far right of the rail can be angled to face left.

Figure 10:
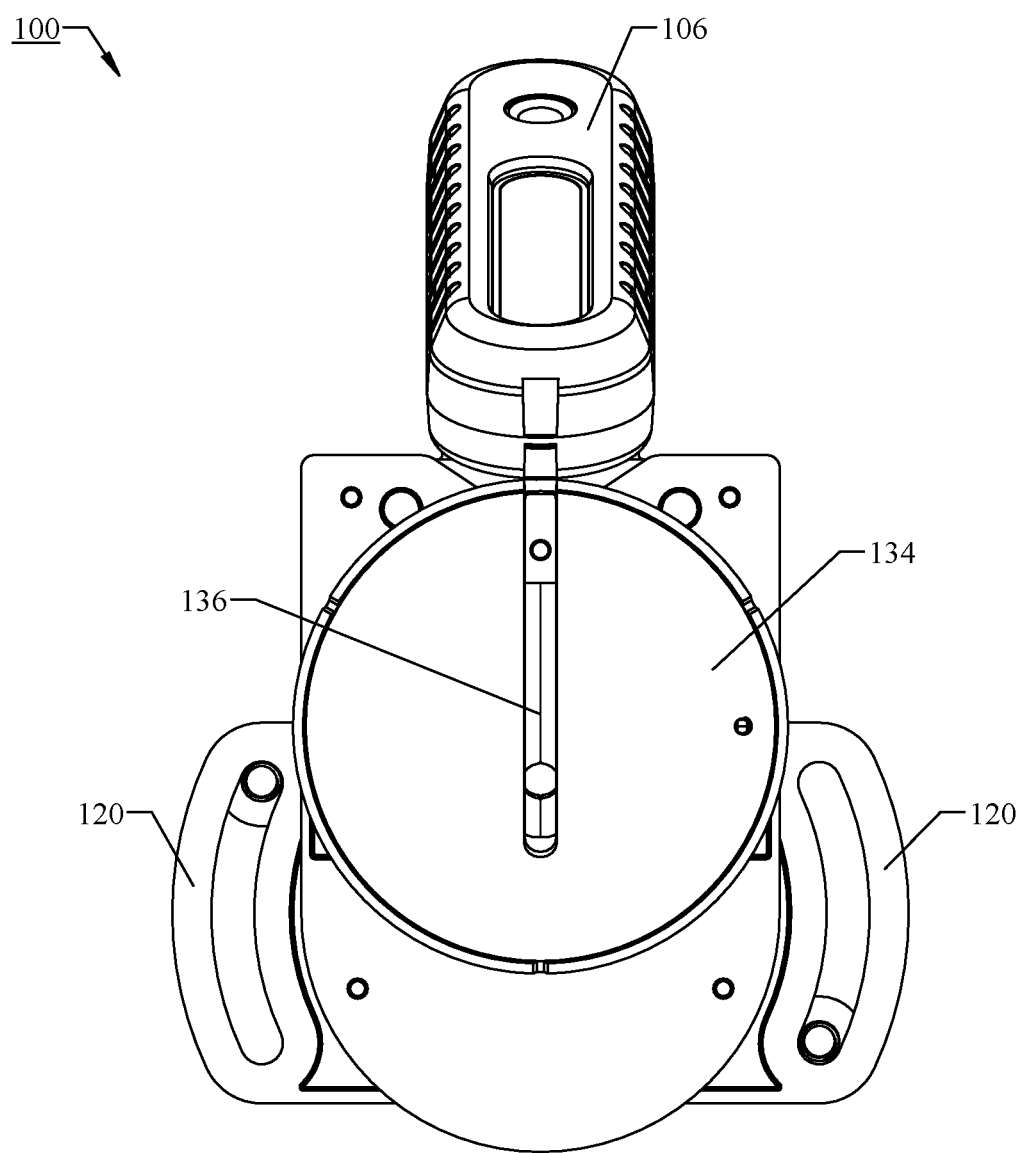
FIG. 10 is a bottom view of the module, with the laser slot in the dome-shaped cover continuing along the bottom or crown of the dome.

FIG. 10 shows a bottom view of the module 100, with the laser slot 136 in the dome-shaped cover 134 continuing along the bottom or crown of the dome-shaped cover. Directional light (e.g., laser light) can exit the dome-shaped cover anywhere along the extent of the laser slot. With the laser slot extending along the bottom of the dome, the laser light can point directly below the dome-shaped cover and, thus, immediately below and slightly behind (the camera assembly 106 being considered at the front) the module.

Figure 11:
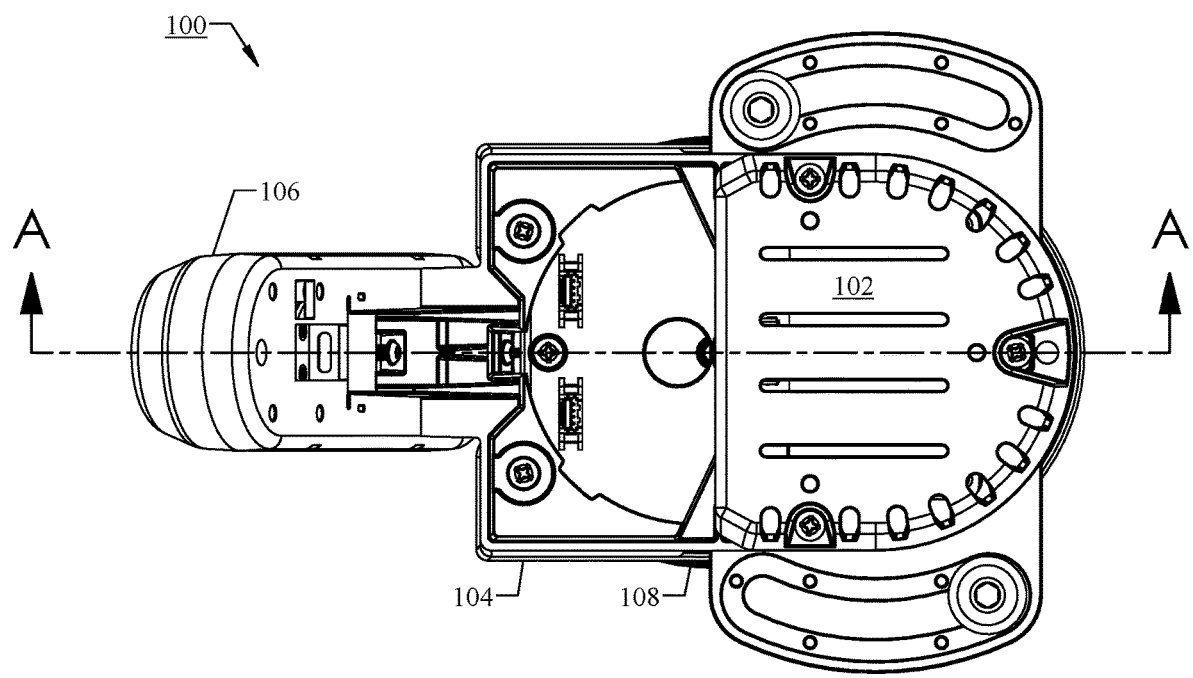
FIG. 11 is a top-down view of the module with a section line bisecting the module through the camera assembly, the mount body, lighting assembly, and the control-board assembly.

FIG. 11 shows a top-down view of the module 100 with a section line AA bisecting the module 100 through the camera assembly 106, the mount body 104, the lighting assembly 108 (scarcely visible in the figure), and the control-board assembly 102.

Figure 12:
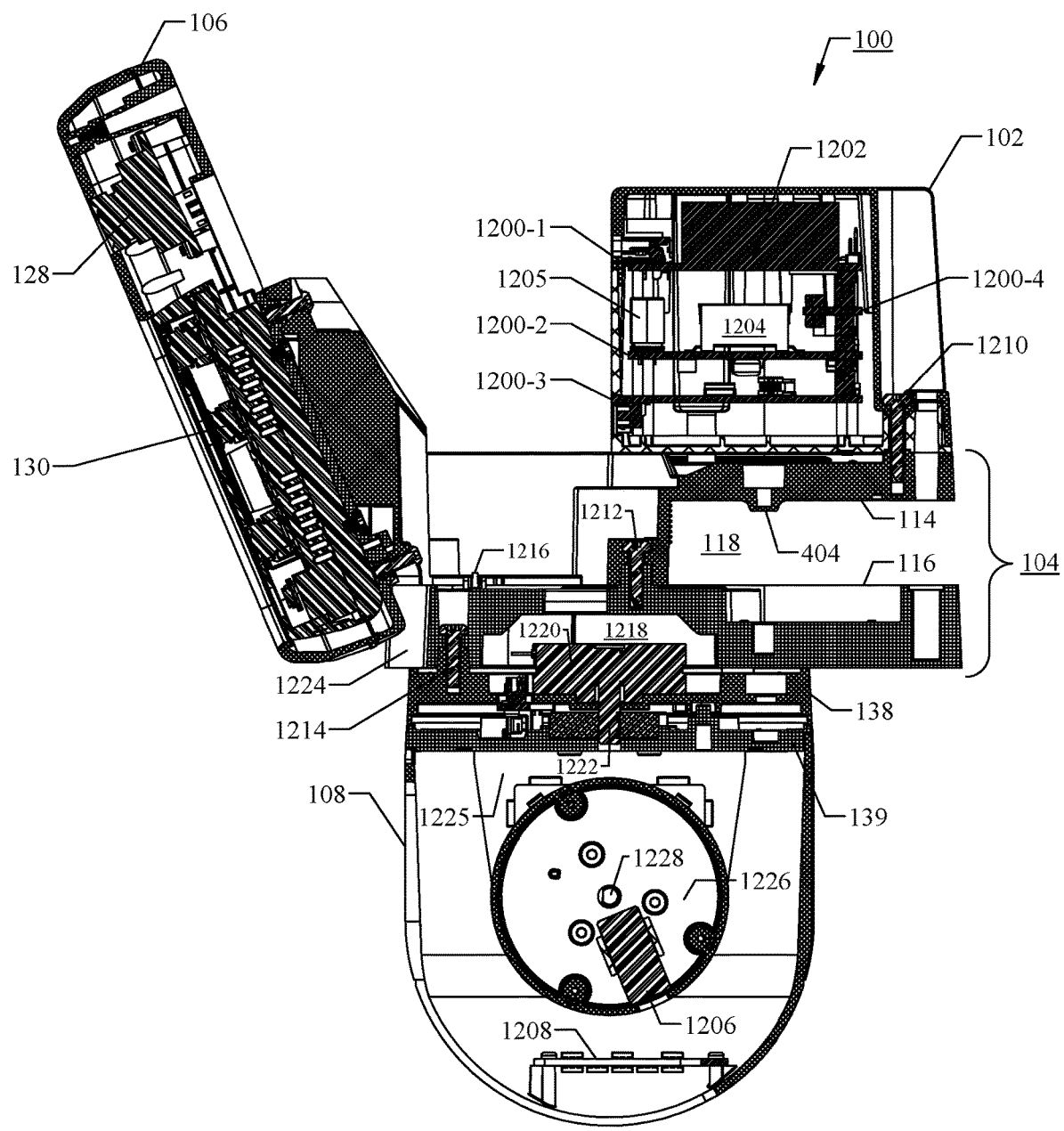
FIG. 12 is a section view of the module in accordance with the section line of FIG. 11.

FIG. 12 shows a section view of the module 100 in accordance with the section line AA of FIG. 11, to disclose various internal features and components of the control-board assembly 102, the mount body 104, the camera assembly 106, and the lighting assembly 108.

The control-board assembly 102 houses a complex of control boards 1200-1, 1200-2, 1200-3 (generally, 1200), and a spacer board 1200-4 in a tower arrangement. Control board 1200-1, atop the tower, is the processor core board 1200-1 that provides the computational power to run algorithms and process images. On the processor core board 1200-1 is a processor (not shown) which executes the algorithms and performs image processing. Mounted to the processor core board 1200-1 is a heat sink 1202. Disposed below the control board 1200-1 is the control board 1200-2, also referred to as the POE+ board. The POE+ board includes the RJ45 receptacle 200 (FIG. 2) and a component 1204 (e.g., a chipset, integrated circuit), which provides internet connectivity and power and converts the POE+ input to 9 v. Below the POE+ board 1200-2 is the control board 1200-3, which connects the complex of control boards 1200 to the stepper motors, optical sensor boards, the RGB camera 128, and the laser 1206 and LED board 1208 of the lighting assembly 108. Disposed between the processor control board 1200-1 and the POE+ board 1200-2 is the control board 1200-4, also referred to as the spacer board. The spacer board 1200-4 provides communication among the processor core board 1200-1, the POE+ board 1200-2, and the motor control board 1200-3. A component on the spacer board 1200-4 converts power from 9 v to 5 v for the processor control board 1200-1.

The mount body 104 includes the upper mount section 114, the lower mount section 116, and the arm 126. The upper mount section 114 includes the retaining boss 404, which projects into the channel 118 between the sections 114, 116. Fasteners 1210 (only one of three shown) secure the control-board assembly 102 to the upper mount section 114, fasteners 1212 (only one of three shown) secure the upper mount section 114 to the lower mount section 116, and fasteners 1214 (only one of three shown) secure the lower mount section 116 to the pan pivot base 138. Bosses in the lower mount section 116 ensure assembly can occur in only one manner. Two electrical connections 1216 pass through the two sections 114, 116, for the pan motor and accompanying optical sensor board. The lower mount section 116 includes a cavity 1218, within which a stepper motor 1220 is disposed. The shaft 1222 of the stepper motor 1220 projects into the laser tilt base 139, by which the stepper motor 1220 rotates the laser tilt base 139, and thus the lighting assembly 108. The laser tilt base 139 can rotate a total of 60°, 30° to either side of center.

The camera assembly 106 houses the RGB camera 128 and the depth sensor 130. Because of the slant at which the arm 126 holds the camera assembly 106, the lower mount section 116 has a recessed region 1224 that allows the bottom of the camera assembly 106 to extend into it.

The lighting assembly 108 houses a laser tilt assembly 1225, which includes a wheel-shaped laser assembly 1226 with the laser 1206 housed therein. In one embodiment, the laser 1206 is a class IIIR red laser. The light-emitting end of the laser 1206 is at the circumference of the wheel-shaped laser assembly 1226. The laser assembly 1226 rotates about an axis 1228 that is perpendicular to the drawn page. Rotating the laser assembly 1226 tilts the laser and, thus, the pointing direction of the laser; the laser tilts vertically, in accordance with the rotation of the laser assembly. In one embodiment, the full range by which laser assembly can tilt the laser is 135 degrees. Below the laser assembly 1226 is the LED board 1208 having an array of LEDs. The LED board 1208 produces RGB light. Under control of the processor, the LED board can provide a variety of signals, for example, red is a warning, green is success, blinking is an attractive alert.

Figure 13:
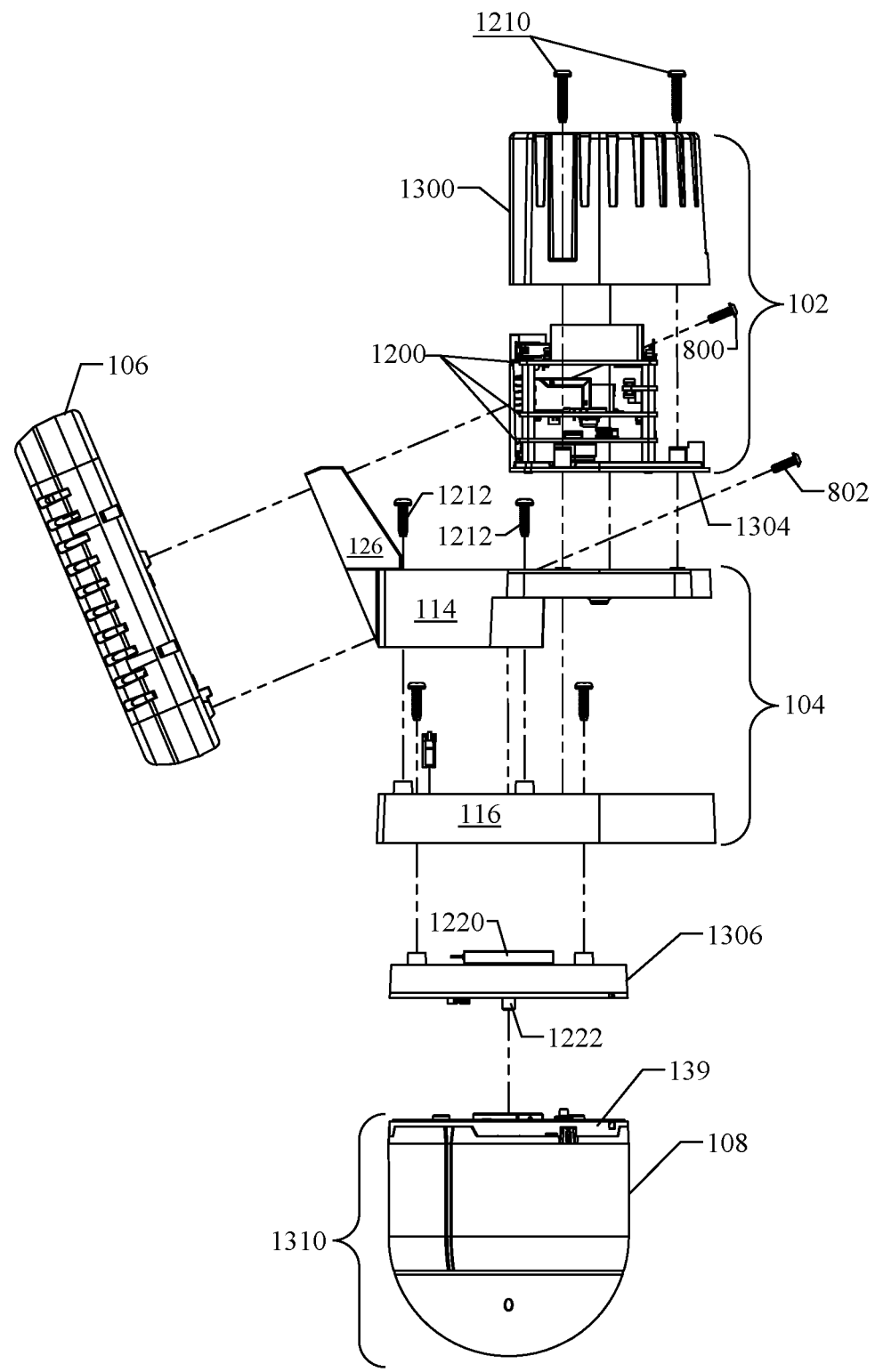
FIG. 13 is an exploded view the module including the control-board assembly, the mount body, the camera assembly, and the lighting assembly.

FIG. 13 shows an exploded view the module 100 including the control-board assembly 102, the mount body 104, the camera assembly 106, and a rotatable laser gimbal 1310, which includes the lighting assembly 108 with the laser tilt base 139. The exploded view illustrates the connectivity among the various assemblies of the module 100. The control-board assembly 102 includes a cover 1300 that houses a tower of control boards 1200. Fasteners 1210, three in all, pass through the cover 1300 and the base 1304 of the control-board assembly 102 and attach to the upper mount section 114 of the mount body 104. Three fasteners 1212 secure the upper mount section to the lower mount section 116 of the mount body 104; fasteners 800, 802 secure the camera assembly 106 to the arm 126 of the mount body 104; and a fastener 1214 (FIG. 12) secures the lower mount section 116 to a pan mount assembly 1306, which includes the pan stepper motor 1220. When the module is assembled, the shaft 1222 of the pan stepper motor 1220 couples to the laser tilt base 139 disposed within the lighting assembly 108.

Figure 14:
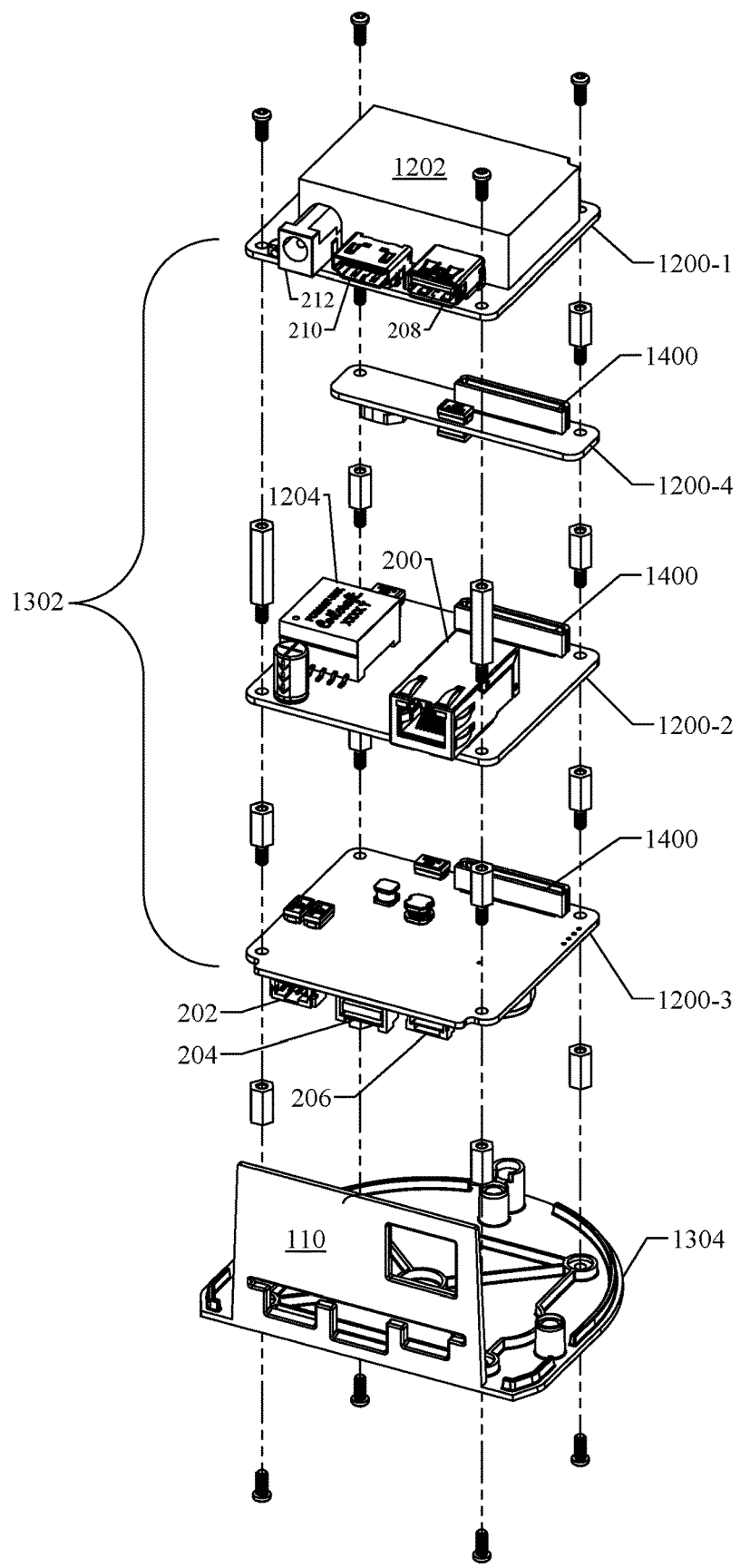
FIG. 14 is an exploded view of the control-board assembly including a processor core board, a POE+ board, a motor control board, and a spacer board.

FIG. 14 shows an exploded view of one embodiment of the control-board assembly 102 (cover omitted) including the processor core board 1200-1, the POE board 1200-2, the motor control board 1200-3, and the spacer board 1200-4. The exploded view illustrates the connectivity among the various boards 1200 (collectively) of the control-board assembly 102. The processor core board 1200-1 includes the heat sink 1202, the depth sensor receptacle 208, the HDMI receptacle 210, and the power input 212. The POE board 1200-2 includes the RJ45 receptacle 200, the POE+ integrated circuit 1204, and the electronic component 1205 (FIG. 12). The motor control board 1200-3 includes the camera receptacle 202, motor/optical sensor receptacle 204, and lighting assembly receptacle 206. The motor control board 1200-3 connects the board stack to the stepper motors, optical sensor boards, RGB camera, laser, and LED board. The tower of control boards 1200 is built on the base 1304, which includes a lower portion of the side panel 110. The cover 1300 (FIG. 13) couples to the base 1304. Pin connectors 1400 electrically connect each pair of neighboring boards 1200 and provide electrical connectivity throughout the tower.

Figure 15:
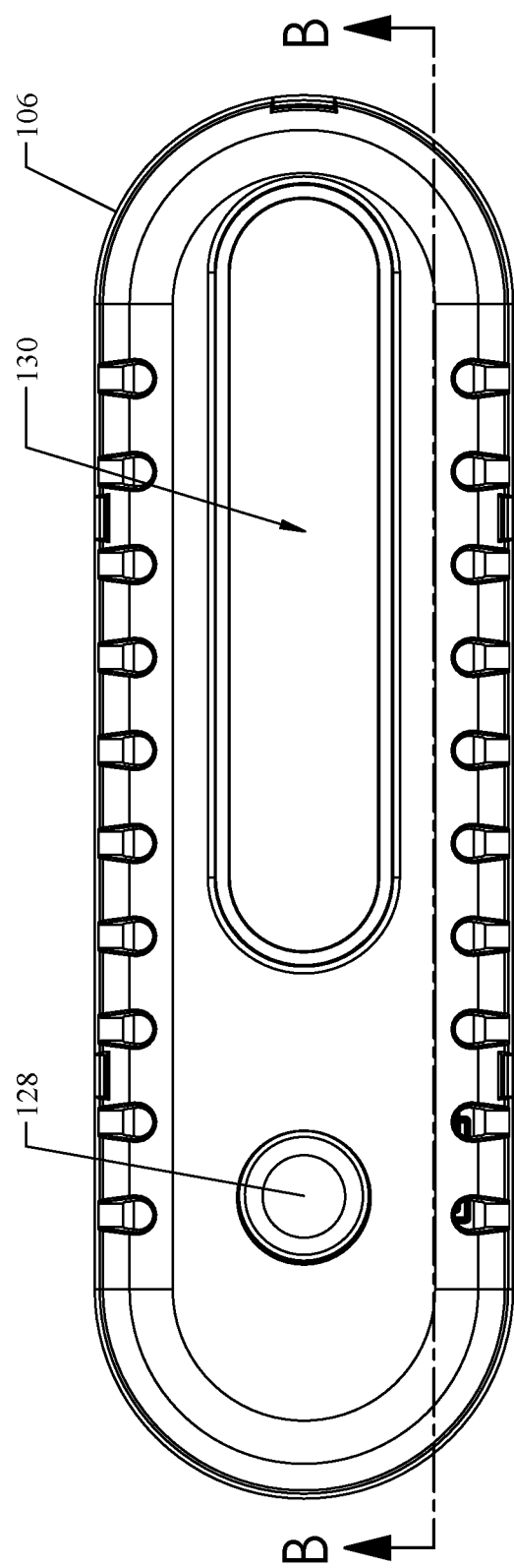
FIG. 15 is a front view of the camera assembly, including the RGB camera and the depth sensor, with a section line passing lengthwise through the housing of the camera assembly.

FIG. 15 shows a front view of the camera assembly 106 with the RGB camera 128 adjacent to the depth sensor 130 (which includes an IR (infrared) projector and two IR cameras offset from the projector by different distances to enable three-dimensional readings). Some commercially available depth cameras (i.e., depth sensors) also include an RGB camera. Typically, however, the dimensions of the field of view of the accompanying RGB camera do not match and may be smaller than those of the depth camera, and thus may be less suitable for object-tracking applications. Accordingly, the separate RGB camera 128 is selected to have a field of view with dimensions that closely match those of the depth sensor 130. Section line B passes lengthwise through the housing of the camera assembly 106.

Figure 16:
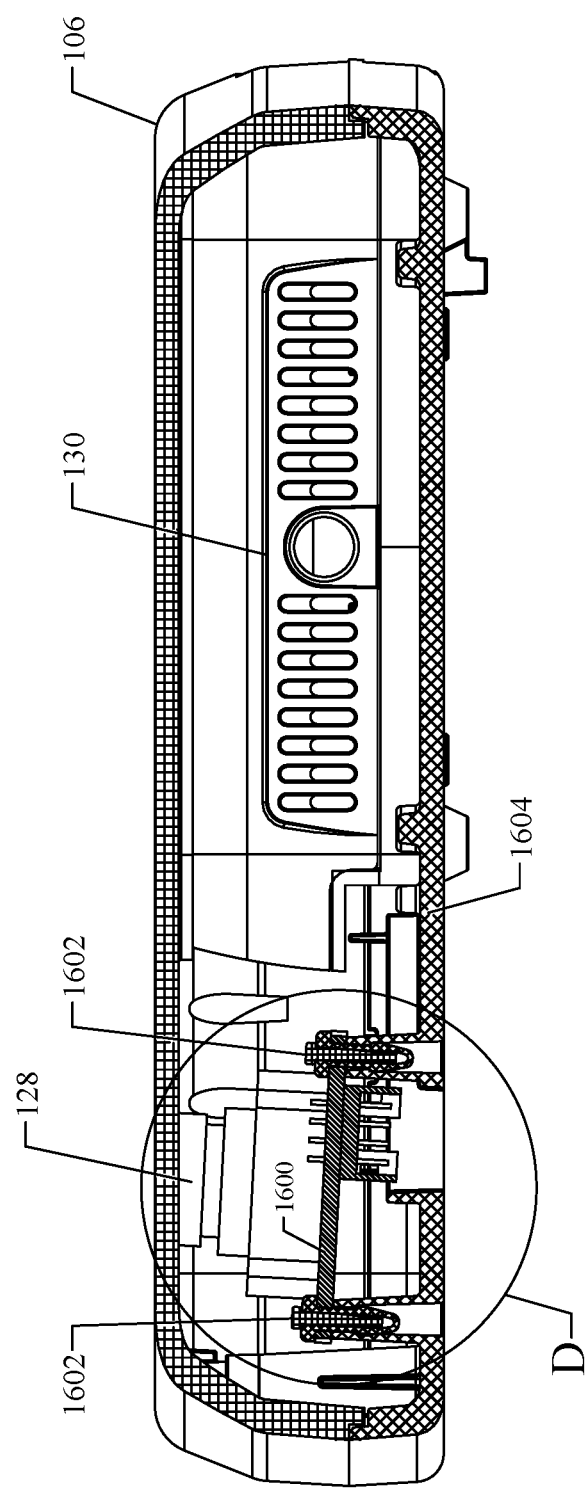
FIG. 16 is a section view of the camera assembly in accordance with the section line of FIG. 15.

FIG. 16 shows the section view of the camera assembly 106 in accordance with the section line BB of FIG. 15. The RGB camera 128 is mounted to a printed circuit board (PCB) 1600. The RGB camera 128 is mounted at a non-zero-degree offset angle relative to the depth camera 130. Because the RGB camera and depth camera, being adjacent each other, have fields of view that are spatially offset from each other, the non-zero-degree offset angle increases the overlap of their fields of view. The offset angle makes mounting the camera with screws difficult because the bearing surfaces of the screws do not contact the PCB board 1600 uniformly. To overcome this problem, plastic push rivets 1602 are used to fasten the RGB camera to the housing frame 1604. The plastic push rivets allow for the misalignment of the hole axis with the mounting surface.

Figure 17:
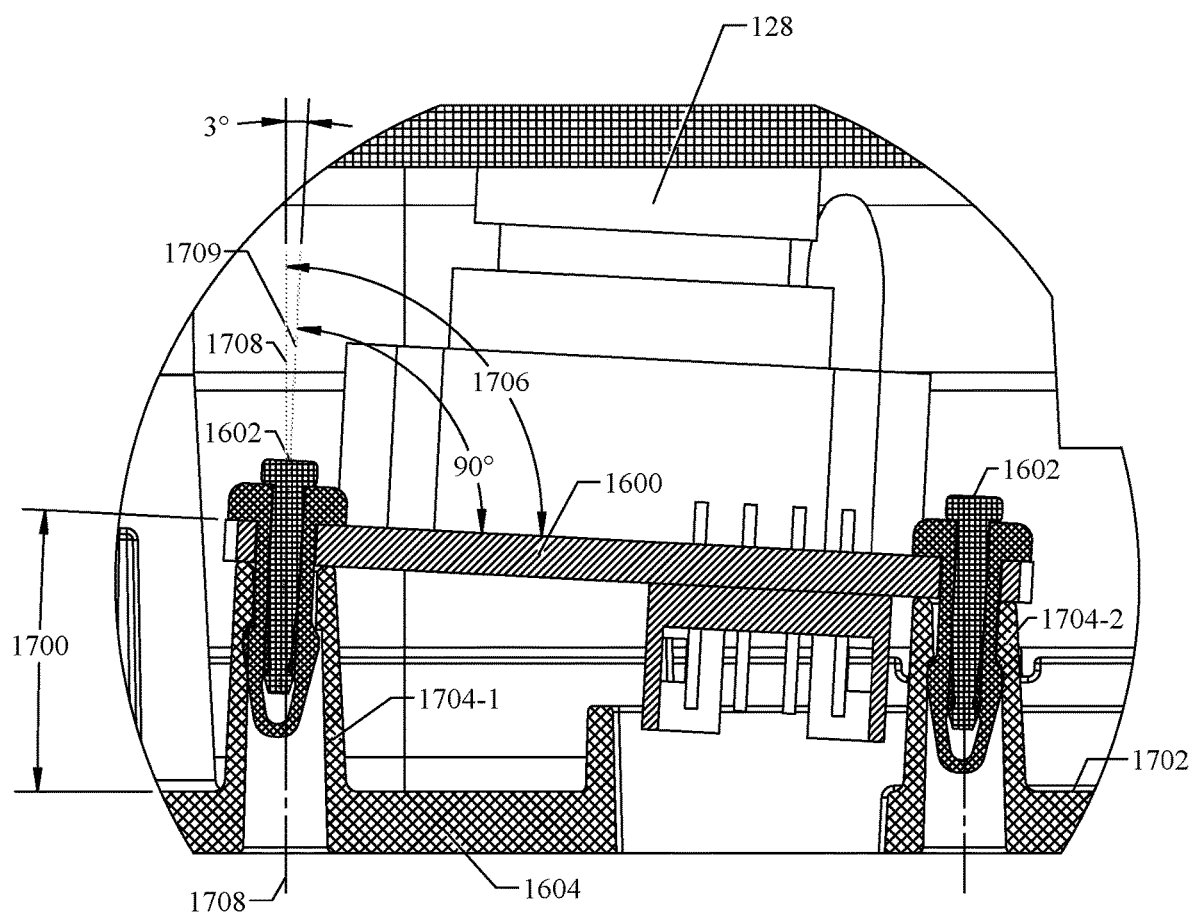
FIG. 17 is a detail view of the RGB camera mounted at an offset angle relative to a mounting surface of the depth camera.

FIG. 17 shows a detail view of the region surrounded by circle D in FIG. 16. In this embodiment shown, the RGB camera 128 is mounted at a 3-degree offset angle 1700 relative to a mounting surface 1702 of the depth camera 130. The offset angle 1700 tilts the RGB camera towards the depth camera 130. The technique includes two pairs of support mounts 1704-1, 1704-2 (generally 1704) of different heights (support mounts 1704-2 being the shorter of the two pair). In FIG. 17, each pair of support mounts has one support mount in the foreground obscuring the other in the background. The support mounts 1704 support the board 1600 that holds the RGB camera 128 at the non-zero-degree angle. The support mounts have rivet holes to receive the plastic push rivets. The rivets pass through the board 1600 into the rivet holes of the support mounts to secure the RGB camera to the frame 1604. The plastic push rivets 1602 allow for the misalignment of the rivet axis 1709 with the mounting surface 1702. The angle 1706 between the perpendicular axis 1708 of the push rivet hole (for mount pair 1704-1) and the board 1600 is 93 degrees. The angle between the perpendicular axis 1708 of the rivet hole and the perpendicular axis 1709 through the push rivet 1602 is 3 degrees.

Figure 18:
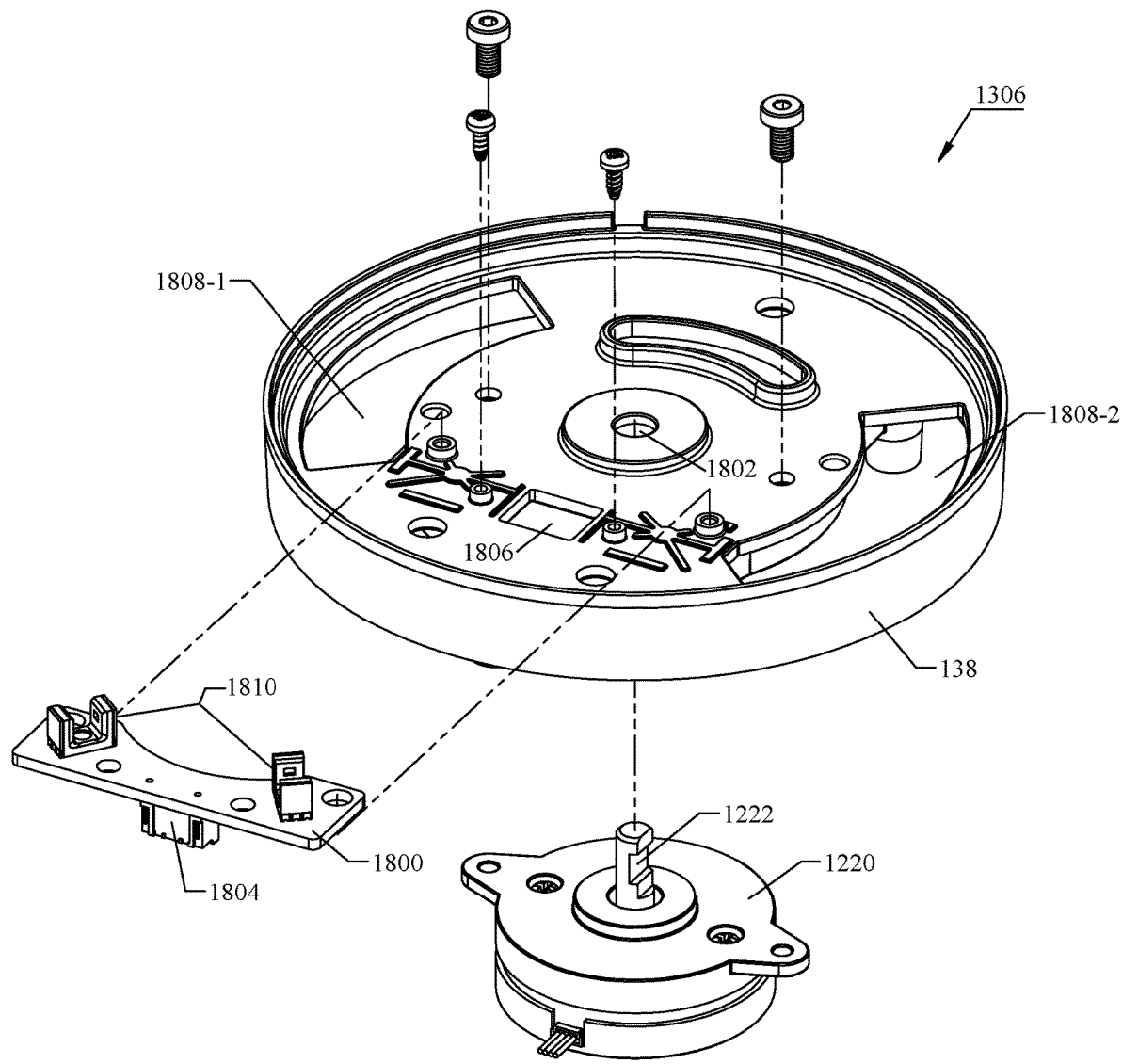
FIG. 18 is an exploded view of the pan mount assembly, including the circular pan pivot base, an optical sensor board, and the stepper motor.

FIG. 18 shows an exploded view of one embodiment of the pan mount assembly 1306, including the circular pan pivot base 138, an optical sensor board 1800, and the stepper motor 1220 (FIG. 12). The exploded view is of the underside of the pan mount assembly 1306. The shaft 1222 of the stepper motor passes through a central opening 1802 of the pan pivot base 138 from the topside of the pan mount assembly 1306; the optical sensor board 1800 attaches to the underside, with a four-pin wiring connector of the sensor 1804 extending through a rectangular aperture 1806. The optical sensor 1800 determines when the stepper motor has rotated the pan pivot base 138 to a specific location. This specific location corresponds to when two projections, referred to as bosses 2024 on the laser tilt base 139 (FIG. 20) interrupt a light beam sent out by the emitting diode portions 1810 of the optical sensor 1800. The pan pivot base 138 includes a pair of arcuate openings 1808-1, 1808-2 (generally 1808) through which wires pass. Wires passing through opening 1808-1 are for the laser and LED board; wires passing through 1808-2 are for the tilt motor and tilt optical sensor board. Each of the arcuate openings 1808 spans 80 degrees, 40 degrees each side of center, which gives room for the wires to travel 60 degrees, 30 degrees each side of center.

Figure 19:
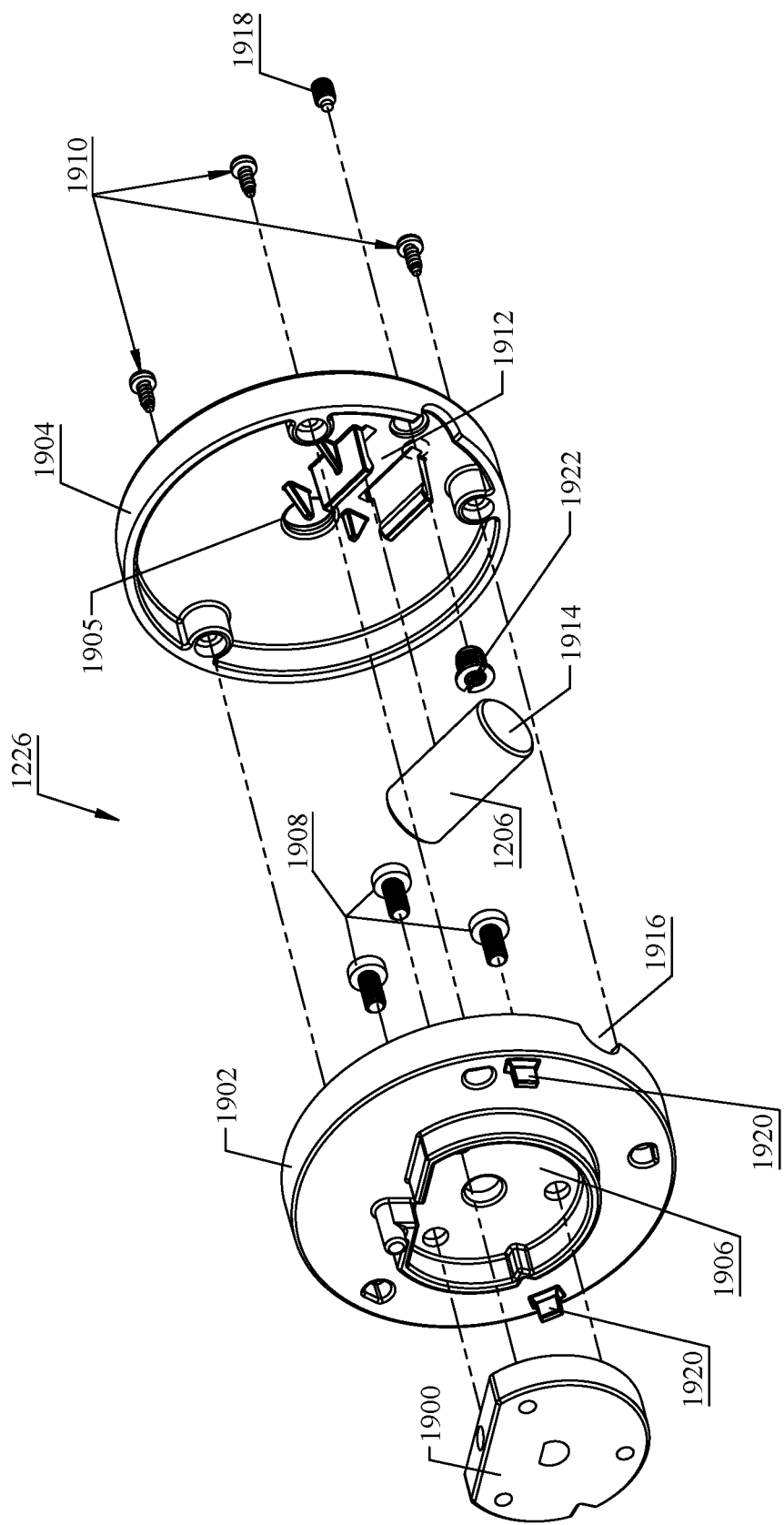
FIG. 19 is an exploded view of a laser assembly, including a hub for receiving the shaft of a stepper motor, a laser pivot base, a laser pivot top, and the laser.

FIG. 19 shows an exploded view of one embodiment of the laser assembly 1226, including a 3-screw hub 1900 (for receiving the shaft of a stepper motor—not shown), a laser pivot base 1902, a laser pivot top 1904, and the laser 1206 (e.g., FIG. 12). The hub 1900 fits closely into a compartment 1906 on one side of the laser pivot base 1902 and is secured therein by three fasteners 1908 that enter the hub from the other side of the laser pivot base 1902. The hub 1900 can be assembled in only one way because of a notch. Fasteners 1910 join the laser pivot base 1902 to the laser pivot top 1904. On an interior side, the laser pivot top 1904 has a compartment 1912 for holding the laser 1206 in position where the light-emitting end 1914 of the laser is at an opening 1916 formed by the joined laser pivot base and top. Wiring to the laser 1206 exits through the center hole 1905. A set screw 1918, which passes through a press-fit expansion thread 1922, secures the laser 1206 within the laser assembly 1226.

Figure 20:
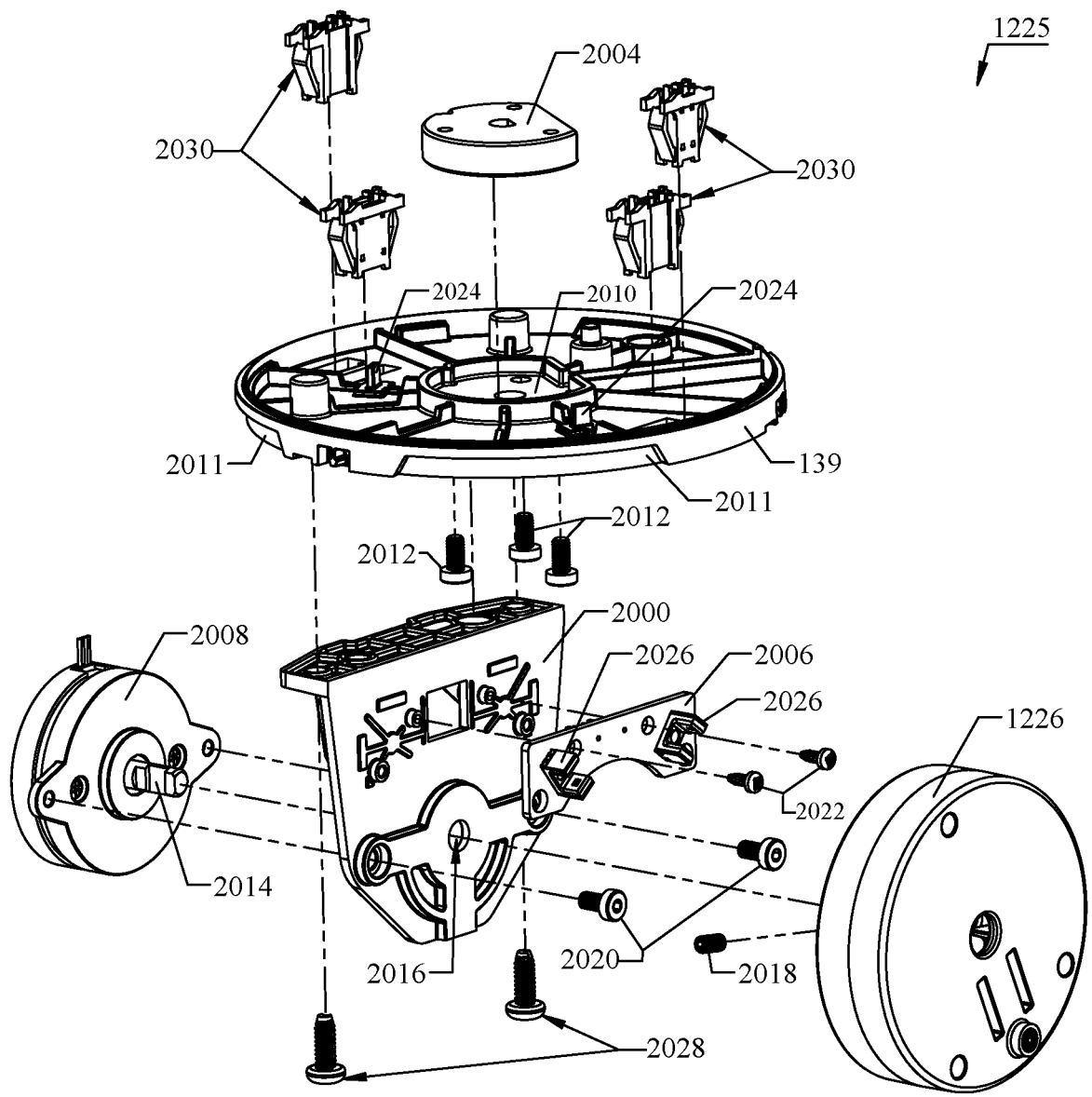
FIG. 20 is an exploded view of the laser tilt assembly, including a laser mount upright, a laser tilt base, a hub, an optical sensor board, a stepper motor, and the laser assembly of FIG. 19.

FIG. 20 shows an exploded view of one embodiment of the laser tilt assembly 1225, including a laser mount upright 2000, the laser tilt base 139, a 3-screw hub 2004, an optical sensor board 2006, a stepper motor 2008, and the laser assembly 1226 of FIG. 19. The laser tilt base 139 has a compartment 2010 sized and shaped to closely receive the hub 2004, into which the shaft 1222 of the stepper motor 1220 (FIG. 18) enters. Three fasteners 2012 enter the hub 2004 from the other side of the laser tilt base 139 to secure the hub 2004 in the compartment 2010. The laser tilt base 139 is adapted to couple to the pan pivot base 138 (FIG. 18). When the shaft 1222 of the stepper motor 1220 (FIG. 18) turns, the laser tilt base 139 rotates with it, thereby panning the direction of the laser light horizontally. The laser tilt base 139 also has recesses 2011 sized, shaped, and appropriately spaced apart to receive the tabs 142 (FIG. 1) of the dome-shaped cover 134 (FIG. 1).

From a first side of the laser mount upright 2000, the shaft 2014 of the stepper motor 2008 passes through an opening 2016 in the laser mount upright 2000 and enters the central keyed opening of the hub 1900 (FIG. 19) of the laser assembly 1226. A set screw 2018 holds the shaft 2014 in place within the hub 1900. When the shaft 2014 of the stepper motor 2008 turns, the laser assembly 1226 rotates with it, thereby tilting the direction of the laser light vertically.

On the opposite side of the laser mount upright 2000, fasteners 2020 secure the stepper motor 2008 to the laser mount upright 2000. On the opposite side of the laser mount upright 2000, fasteners 2022 secure the optical sensor board 2006 to the laser mount upright 2000. The optical sensor 2006 determines when the stepper motor 2008 has rotated the laser assembly 1226 (FIG. 19) to a specific location that corresponds to when two projections 1920 (FIG. 19) on the laser assembly 1226 interrupt a light beam sent out by the emitting diode portions 2026 of the optical sensor board 2006. Bosses 2024 interrupt the pan motion optical sensor board 2006. Fasteners 2028 secure the laser mount upright 2000 to the laser tilt base 139. Pin receptacles 2030 provide electrical connectivity between the motor control board 1200-3 (FIG. 14) and the stepper motor 2008, the LED board 1208 (FIG. 12), and the laser 1206 (FIG. 19).

Figure 21:
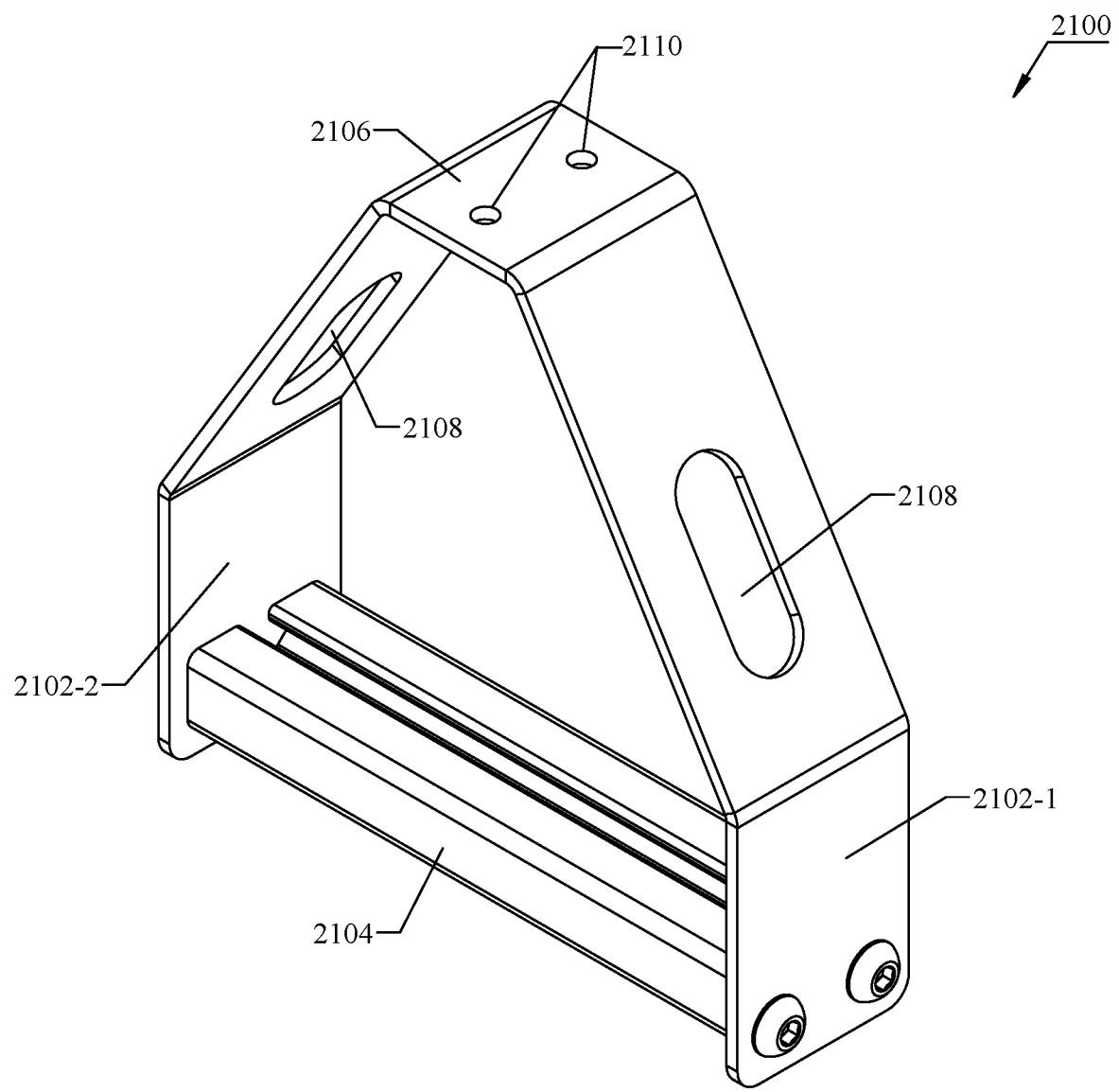
FIG. 21 is an isometric view of an embodiment of a bracket by which to mount the module to an overhead rail.
Figure 24:
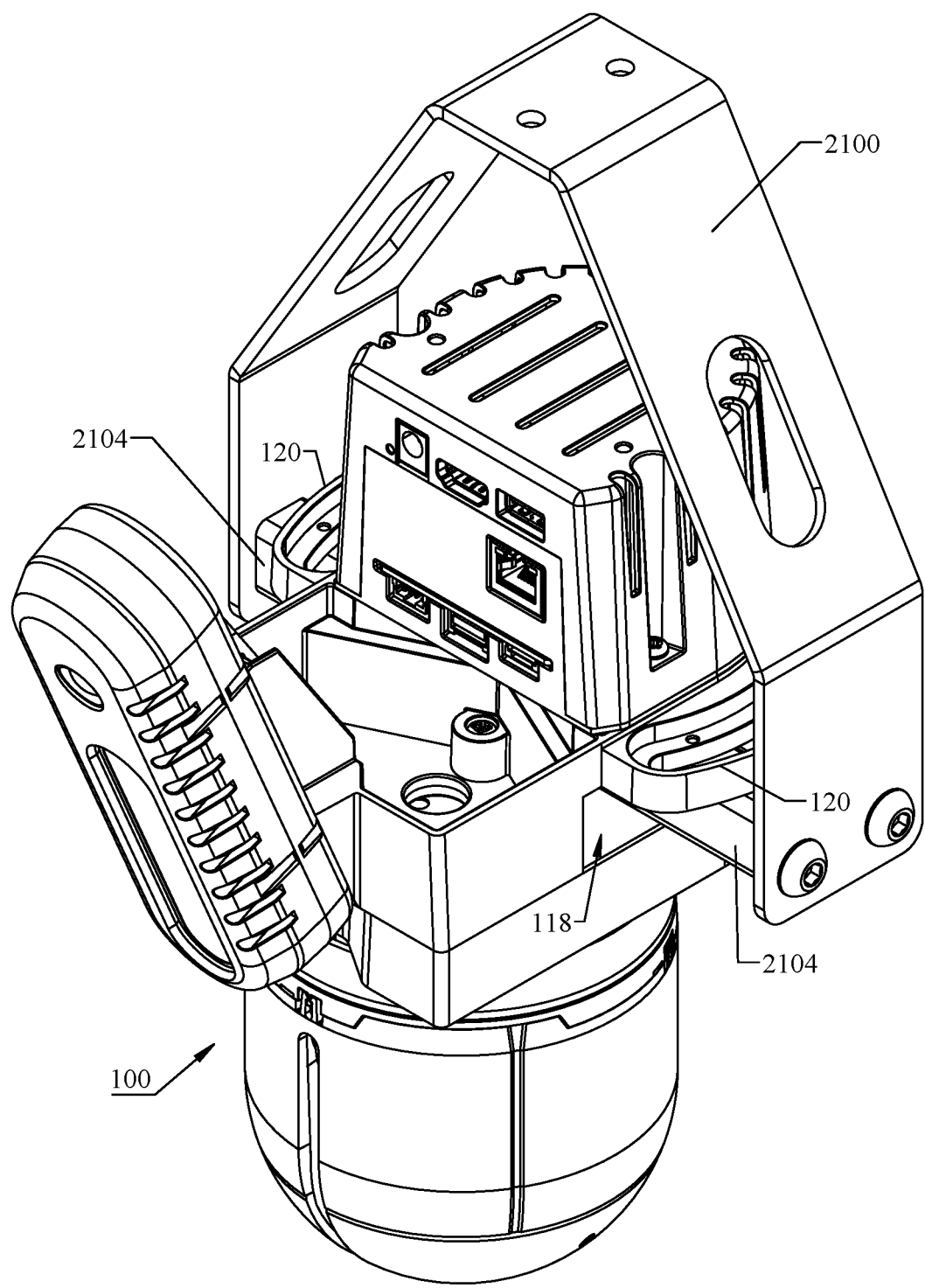
FIG. 24 is an isometric view of the bracket of FIG. 21 attached to the module.

FIG. 21 shows an alternative embodiment by which to mount the module 100 to an overhead rail. In this embodiment, a v-shaped bracket 2100 with two arms 2102-1, 2102-2 that secure to opposite sides of a channel bar 2104. The channel bar 2104 is placed within the channel 118 of the module (e.g., as shown in FIG. 24). Flange bolts 124 (FIG. 1) secure the module to the channel bar. At the peak or point of the V is a horizontal mounting surface 2106. The mounting surface 2106 has holes 2110 for receiving mounting bolts to secure the bracket 2100 to an overhead rail. When connected to the bracket 2100, the overhead rail runs generally perpendicular to the channel bar 2104. In another embodiment, the overhead rail runs parallel to the channel bar. In the sides of the bracket 2100 are elliptical openings 2108 that provide space to enable an allen key to reach the screws 124 (FIG. 1) to tighten the module in place.

Figure 22:
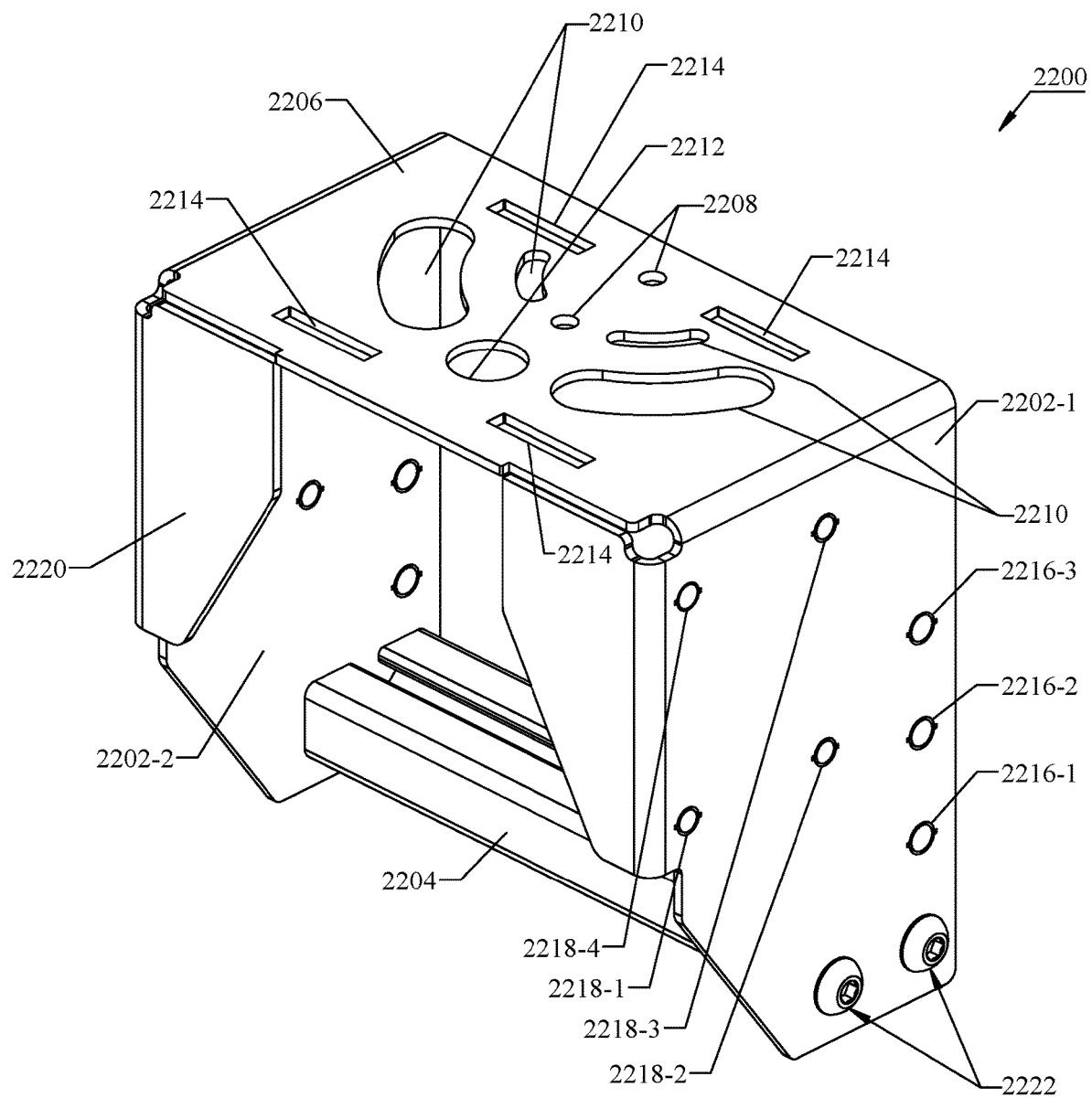
FIG. 22 is an isometric view of another embodiment of a bracket by which to mount the module in a variety of configurations.

FIG. 22 shows another embodiment by which to mount the module 100 to a structure, such as a rail, a post, or a flat surface. In this embodiment, a rectangular-shaped bracket 2200 has two opposing sides 2202-1, 2202-2, a channel bar 2204, and a fastening surface 2206. The fastening surface 2206 has holes of different shapes and sizes including holes 2208, small and large arcuate openings 2210, a circular opening 2212, and slots 2214. The holes 2208 can be used to receive mounting bolts to secure the bracket to the structure. The large arcuate openings provide clearance for the grommet used to protect the POE+ cable coming from the rail to which the bracket is mounted. The small arcuate openings provide space for the fastening bolts to pass through surface 2206 and secure the bracket 2200. The circular opening 2212 is used for when the bracket 2200 is mounted with the channel bar 2204 perpendicular to the rail (i.e., boom), and the arcuate openings of the same diameter are for when the bracket 2200 is mounted on the rail at an angle. The sides 2202-1, 2202-2 each has several punch-out holes of two different sizes: holes 2216-1, 2216-2, and 2216-3 are near an edge of the side 2202-1 and are larger in size than holes 2218-1, 2218-2, 2218-3, and 2218-4, which form a rectangular constellation.

Figure 25:
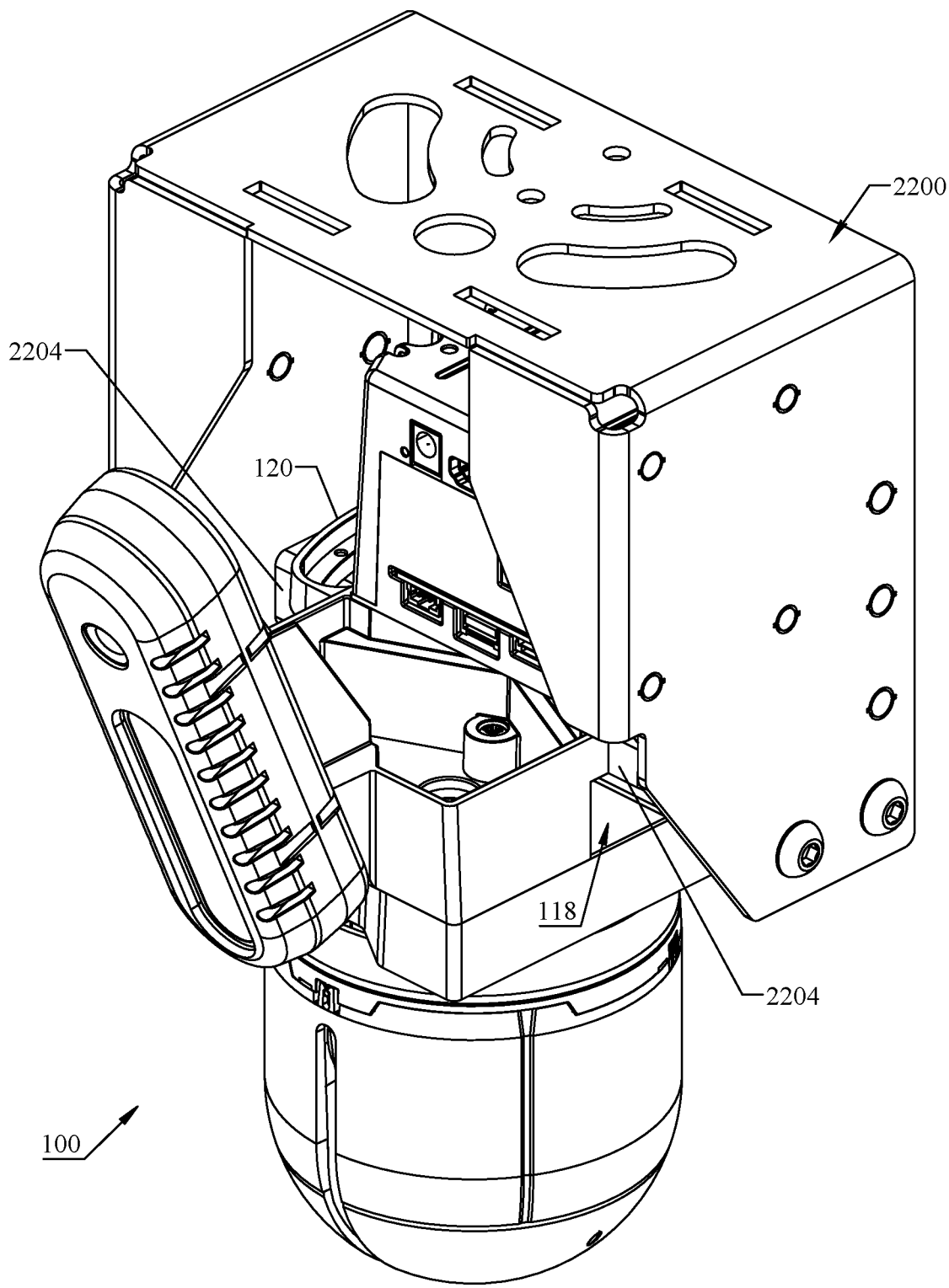
FIG. 25 is an isometric view of the bracket of FIG. 22 attached to the module in a first configuration.

The rectangular-shaped bracket 2200 can be mounted in at least six different ways. FIG. 25 shows a first configuration in which to mount the bracket 2200 under a rail or under a shelf. In this configuration, bolts 2222 fasten the channel bar 2204 at both of its ends to the opposing side surfaces 2202-1, 2202-2. The channel bar 2204 is placed within the channel 118 of the module 100 and flange bolts 124 (FIG. 1) secure the module to the channel bar. When connected to the bracket 2200, an overhead rail runs generally perpendicular to the channel bar 2204.

In a second configuration, the bracket 2200 can be mounted against a wall or similar surface by fastening the surface 2206 flush against the surface using four bolts through slots 2214. In this configuration, the channel bar 2204 is mounted in holes 2216-3 and 2216-2, or in holes 2216-2 and 2216-1, with the groove in the channel bar 2204 parallel to and facing the panel 2220. Before mounting, the inner material of the two selected holes is punched out to allow the bolts 2222 to pass through them and into the channel bar 2204.

In the third and fourth configurations, the bracket 2200 can be mounted with either the side 2202-1 or side 2202-2 pressed flush against a surface, using holes 2218-1, 2218-2, 2218-3, and 2218-4 to mount to the surface or to a circular tube measuring 1" in diameter using U-bolts.

In a fifth configuration, the bracket 2200 can be mounted with the surface 2206 flush on top of a surface or shelf and fastened using bolts and the slots 2214. In this configuration, the bracket 2200 is upside down from at shown in FIG. 22, with the bolts 2222 fastening the channel bar 2204 to the sides 2202-1, 2202-2 as shown in FIG. 22, but with the channel bar 2204 rotated 180 degrees so that groove in the channel bar s parallel to and facing away from the opposing surface 2206.

In a sixth configuration, the bracket 2200 can be mounted on a vertical rail or on a vertical surface using holes 2208 to fasten the bracket to the rail or surface. In this configuration the channel rail 2204 is mounted either in holes 2216-3 and 2716-2 or in holes 2216-2 and 2216-1 with the groove in the channel bar being parallel to and facing the panel 2220.

Figure 23:
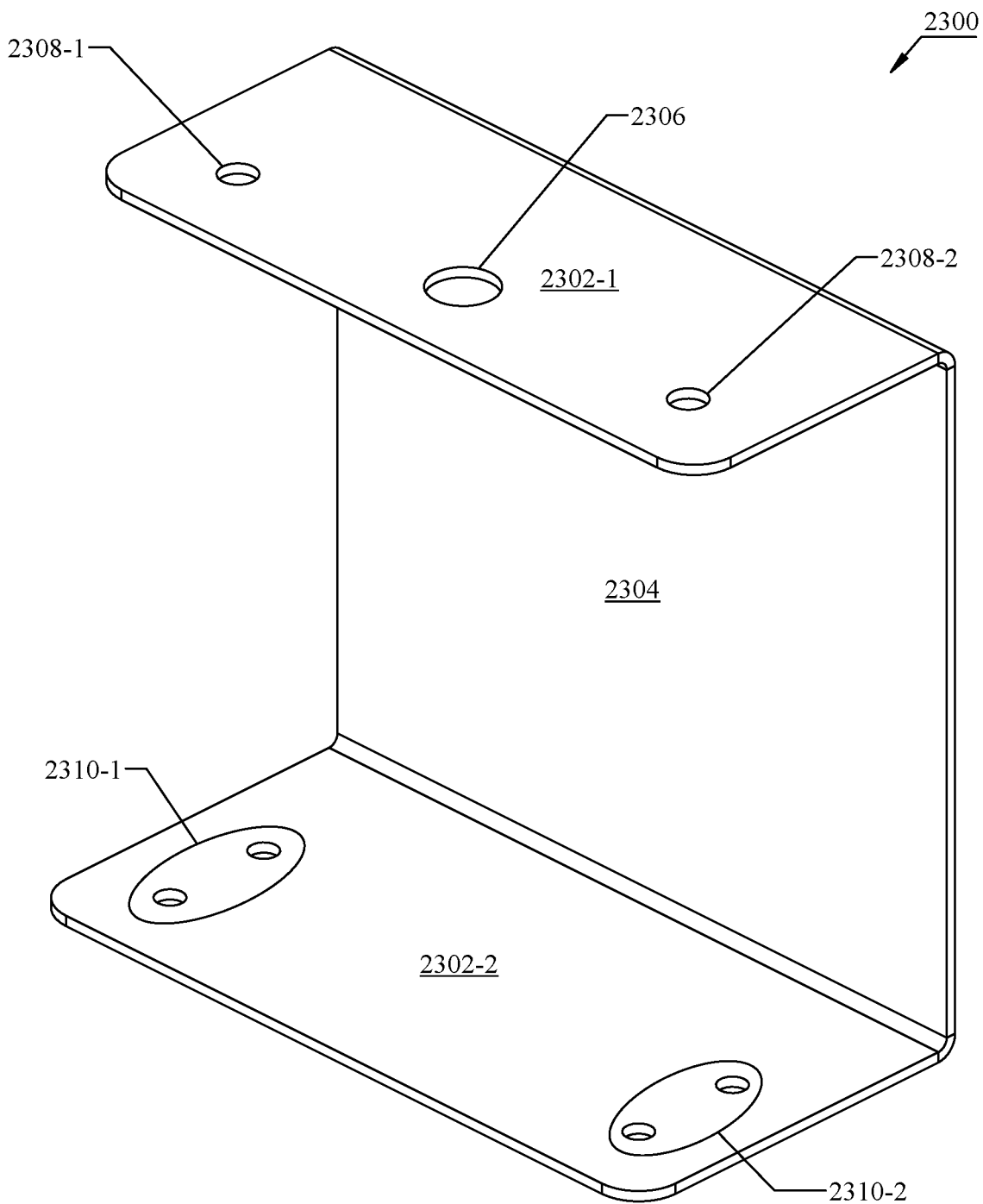
FIG. 23 is an isometric view of another embodiment of a bracket by which to mount the module to a surface, for example, a shelf.
Figure 26:
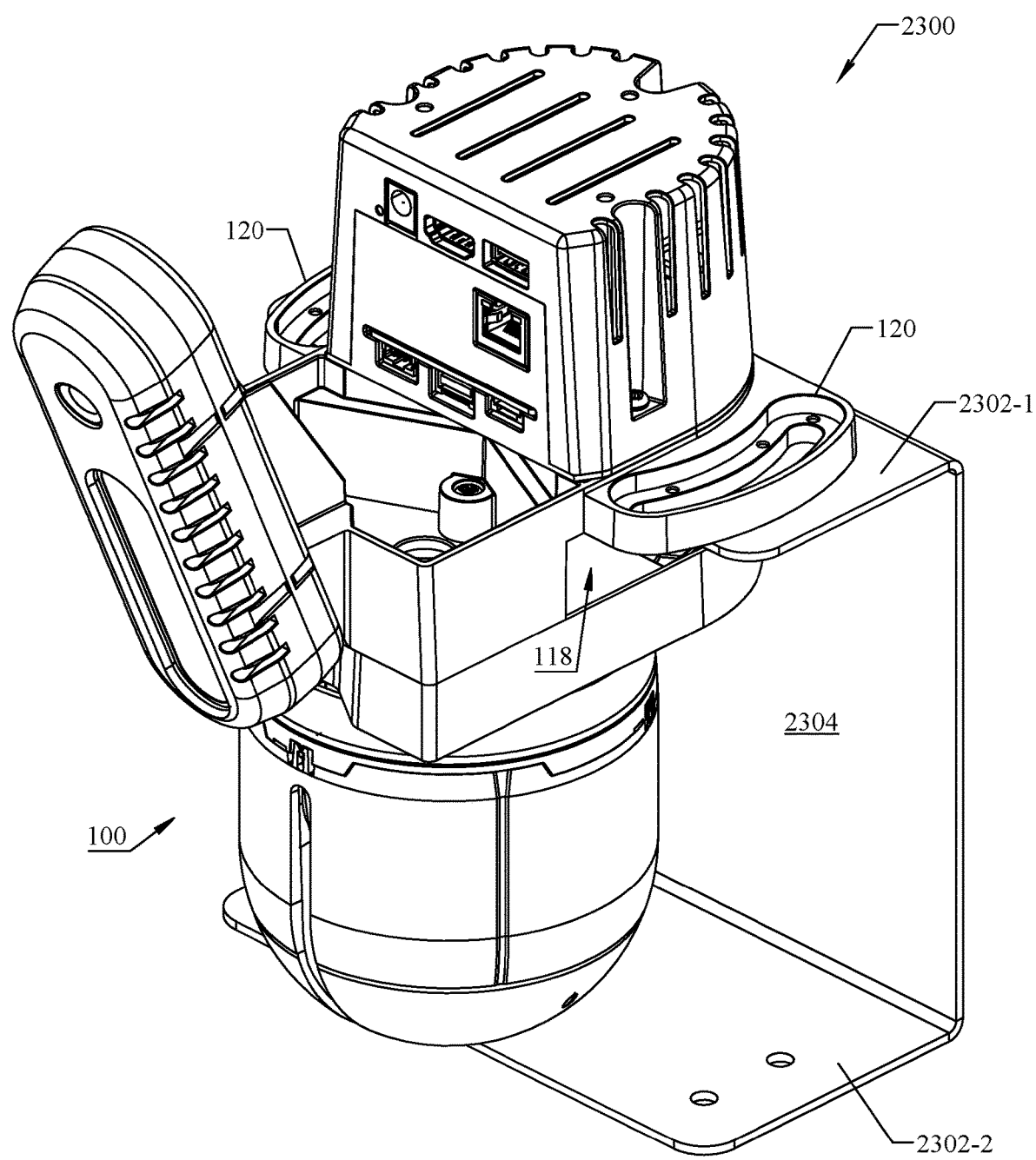
FIG. 26 is an isometric view of the bracket of FIG. 23 attached to the module.

FIG. 23 shows an embodiment of a U-shaped bracket 2300 by which to attach the module 100 to a surface, for example, a shelf. Unlike the brackets 2100, 2200 of FIG. 21 and FIG. 22, respectively, this embodiment of bracket 2300 does not have a channel bar for attaching to the module. The bracket 2300 includes opposing walls 2302-1, 2302-2 (generally, 2302) and an orthogonal sidewall 2304 disposed therebetween. The spacing between the walls 2302, which corresponds to the height of the sidewall 2304, is wide enough to fit the lighting assembly therebetween, as shown in FIG. 26. One of the walls 2302-1 couples to the module 100; the other of the walls 2302-2 couples to a flat surface, such as a shelf. The wall 2302-1 that couples to the module 100 includes a middle opening 2306 and two outer openings 2308-1, 2308-2 (generally, 2308), one outer opening 2308 on each side of the middle opening 2306. The middle opening 2306 is to allow for clearance of the boss 404 (FIG. 5). The locations of the outer openings 2308 align with the flanges 120 (FIG. 1) of the module; the size of the openings 2308 are designed to receive hardware (i.e., fasteners 124 of FIG. 1) that secure the bracket 2300 to the flanges 120. The openings 2308 allow fasteners 124 (FIG. 1) to pass through and tighten to nuts (not shown) to fasten the module 100 to the surface 2302-1. The opposite wall 2302-2, which couples to a flat surface, has two pairs of openings 2310-1, 2310-2 for receiving hardware or fasteners that couple the bracket 2300 (and the module 100) to that surface. The bracket 2300 can attach to the module as shown in FIG. 26, with the wall 2302-1 passing below the flanges 120, part of the way into the channel 118. While the module 100 faces directly forward in FIG. 26, the kidney-shaped openings in the flanges 120 allow the module to be coupled at an angle facing left or right.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A computer-vision system comprising:
a mount body having a channel sized to receive a rail, the channel having a sidewall disposed between opposing walls, the sidewall having multiple angled surfaces that determine a full range of angles at which the rail can be secured to the mount body;
a camera assembly attached to the mount body, the camera assembly including an image sensor that captures images within its field of view;
a lighting assembly housing one or more light sources; and
a controller in electrical communication with the camera assembly to acquire the images captured by the image sensor and with the lighting assembly to control operation of the one or more light sources, the controller configured to acquire information about an object, to associate a location within the field of view of the image sensor with the object, to point light emitted by the one or more light sources at the location associated with the object by articulating at least one of the lighting assembly and the one or more light sources, and, based on an image acquired from the camera assembly, to detect change within the field of view of the image sensor corresponding to placement or removal of the object.

2. The computer-vision system of claim 1, further comprising a guidance system that includes a directional light source of the one or more light sources and an electrical and/or mechanical system for operating at least one of the directional light source or an audio system of the computer-vision system.

3. The computer-vision system of claim 2, wherein the guidance system directs light from the directional light source or generates audio from the audio system to instruct a user where the object should be placed.

4. The computer-vision system of claim 2, wherein the guidance system directs light from the directional light source or generates audio from the audio system to instruct a user where the object is located for removal from the location.

5. The computer-vision system of claim 1, wherein the camera assembly further comprises a depth sensor fixed to a mounting surface and a plurality of support mounts of different heights attached to a frame of the camera assembly, and wherein the image sensor is mounted to a board held by the plurality of support mounts at a non-zero offset angle relative to the mounting surface upon which the depth sensor is fixed.

6. The computer-vision system of claim 1, further comprising:
a bracket with two arms and a mounting surface; and
a channel bar attached between ends of the two arms, the channel bar having dimensions adapted to fit closely within.

7. A computer-vision system comprising:
a lighting assembly housing at least one light source;
a camera assembly housing an RGB (red green blue) camera and a depth camera that capture image information within their fields of view, the camera assembly having a mounting surface upon which the depth camera is fixed, a plurality of support mounts of different heights attached to a frame of the camera assembly, the RGB camera being mounted to a board held by the plurality of support mounts at a non-zero offset angle relative to the mounting surface upon which the depth camera is fixed; and
a controller in communication with the camera assembly to receive image information captured by the cameras and with the lighting assembly to control operation of the at least one light source, the controller housing control boards including a processor configured to receive and process images captured by the camera assembly and to operate the at least one light source in response to the processed images.

8. An apparatus comprising:
a mount body by which to secure the apparatus to a rail, the mount body having a channel sized to receive the rail therethrough, the channel having a sidewall disposed between opposing walls, the sidewall having multiple angled surfaces that determine a full range of angles at which the rail can be secured to the mount body;
a camera assembly attached to the mount body such that the camera has a field of view that faces downwards when the apparatus is secured to the rail; and
a light-guidance assembly movably attached to the mount body, the light-guidance assembly housing one or more light sources, wherein the camera assembly is in electronic communication with a controller to provide to the controller image information captured by the camera and with the lighting assembly to control operation of the one or more light sources in response to the processed image information.

9. The apparatus of claim 8, wherein one of the surfaces of the channel has a retaining boss extending therefrom, the retaining boss being located and sized to align with and fit within a groove of the rail.

10. The apparatus of claim 9, further comprising:
a bracket with two arms that end at a mounting surface; and a channel bar attached between ends of the two arms, the channel bar having dimensions adapted to fit closely within and pass through the channel of the mount body.

11. The apparatus of claim 9, wherein the camera assembly has a depth sensor fixed to a mounting surface and a plurality of support mounts of different heights attached to a frame of the camera assembly, and wherein the image sensor is mounted to a board supported by the plurality of support mounts and held at a non-zero offset angle relative to the mounting surface to which the depth sensor is fixed.

12. The apparatus of claim 11, wherein the support mounts have rivet holes, and the camera assembly further comprises push rivets that pass through the board into the rivet holes of the support mounts to secure the image sensor within the camera assembly.

13. The apparatus of claim 9, wherein the mount body includes a pair of flanges, one flange of the pair on each opposite side of the mount body, each flange having an opening therein, and further comprising a bracket coupled to the mount body, the bracket having two opposing walls and a sidewall disposed therebetween, a first wall of the two walls entering the channel of the mount body and having openings that align with the openings of the flanges for receiving fasteners therethrough that secure the first wall to the flanges, a second wall of the two walls having openings therein for receiving fasteners therethrough that secure the second wall to a surface.

14. The apparatus of claim 9, wherein the one or more light sources includes a directional light source fixed to a laser assembly, and further comprising a first motor operably coupled to the lighting assembly to pan the directional light source horizontally and a second motor operably coupled to the laser assembly to tilt the directional light source vertically.

15. The computer-vision system of claim 7, further comprising a guidance system that includes a directional light source of the at least one light source and an electrical and/or mechanical system for operating the directional light source.

16. The computer-vision system of claim 15, wherein the guidance system directs light from the directional light source to instruct a user where an object should be placed.

17. The computer-vision system of claim 15, wherein the guidance system directs light from the directional light source to instruct a user where an object is located for removal from the location.

18. The computer-vision system of claim 7, further comprising:
a bracket with two arms and a mounting surface; and
a channel bar attached between ends of the two arms, the channel bar having dimensions adapted to fit closely within.

19. The computer-vision system of claim 7, wherein the support mounts have rivet holes, and the camera assembly further comprises push rivets that pass through the board into the rivet holes of the support mounts to secure the RGB camera within the camera assembly.

20. The computer-vision system of claim 7, further comprising an audio system and a guidance system, the guidance system generating audio from the audio system to instruct a user where an object should be placed or where the object is located for removal from the location.

* * * * *